United States Patent [19]

Matyas et al.

[11] Patent Number: 5,103,478
[45] Date of Patent: Apr. 7, 1992

[54] SECURE MANAGEMENT OF KEYS USING CONTROL VECTORS WITH MULTI-PATH CHECKING

[75] Inventors: Stephen M. Matyas, Manassas, Va.; Dennis G. Abraham, Concord, N.C.; Donald B. Johnson, Manassas, Va.; Ramesh K. Karne, Herndon, Va.; An V. Le, Arlington, Va.; Patrick J. McCormack, Rockville, Md.; Rostislaw Prymak, Dumfries, Va.; John D. Wilkins, Somerville, Va.

[73] Assignee: International Business Machines Corporation, Armonk, N.Y.

[21] Appl. No.: 596,637

[22] Filed: Oct. 12, 1990

Related U.S. Application Data

[63] Continuation of Ser. No. 344,165, Apr. 27, 1989, abandoned.

[51] Int. Cl.[5] .......................... H04L 9/32; G06F 7/04
[52] U.S. Cl. ........................................ 380/25; 380/21; 380/43; 380/49
[58] Field of Search .............................. 380/21, 23–25, 380/33, 43, 44, 49, 50; 364/200, 900

[56] References Cited

U.S. PATENT DOCUMENTS

| | | | |
|---|---|---|---|
| 4,223,403 | 9/1980 | Konheim et al. | 380/24 |
| 4,227,253 | 10/1980 | Ehrsam et al. | 380/45 |
| 4,386,233 | 5/1983 | Smid et al. | 380/25 |
| 4,500,750 | 2/1985 | Elander et al. | 380/21 |
| 4,503,287 | 3/1985 | Morris et al. | 380/45 |
| 4,578,530 | 3/1986 | Zeidler | 380/24 |
| 4,683,968 | 8/1987 | Appelbaum et al. | 380/4 |
| 4,723,283 | 2/1988 | Nagasawa et al. | 380/20 |
| 4,723,284 | 2/1988 | Munck et al. | 380/25 |

OTHER PUBLICATIONS

R. W. Jones, "Some Techniques for Handling Encipherment Keys," *ICL Technical Journal*, Nov. 1982, pp. 175–188.

D. W. Davies and W. L. Price, "Security for Computer Networks," John Wiley & Sons, New York, 1984, Sec. 6.5, pp. 168–172.

*Primary Examiner*—Bernarr E. Gregory
*Attorney, Agent, or Firm*—John E. Hoel

[57] ABSTRACT

A requested cryptographic function is validated for performance in conjunction with a cryptographic key, by inputting a first portion of an associated control vector into a first control vector checker, which outputs a first authorization signal if the requested cryptographic function has been authorized by the originator of the key. A second portion of the control vector is input to a second control vector checker, which outputs a second authorization signal if the requested cryptographic function has been authorized by the originator of the key. Both the first and the second authorization signals are applied to a cryptographic processor which initiates the execution of the requested cryptographic function.

26 Claims, 25 Drawing Sheets

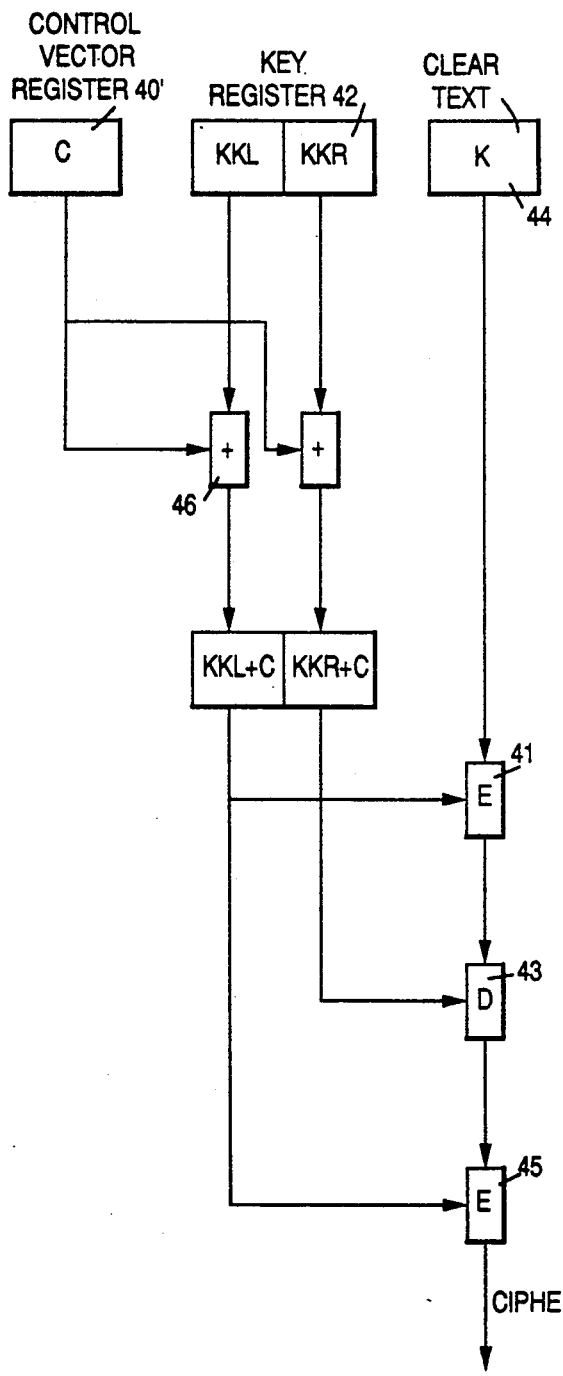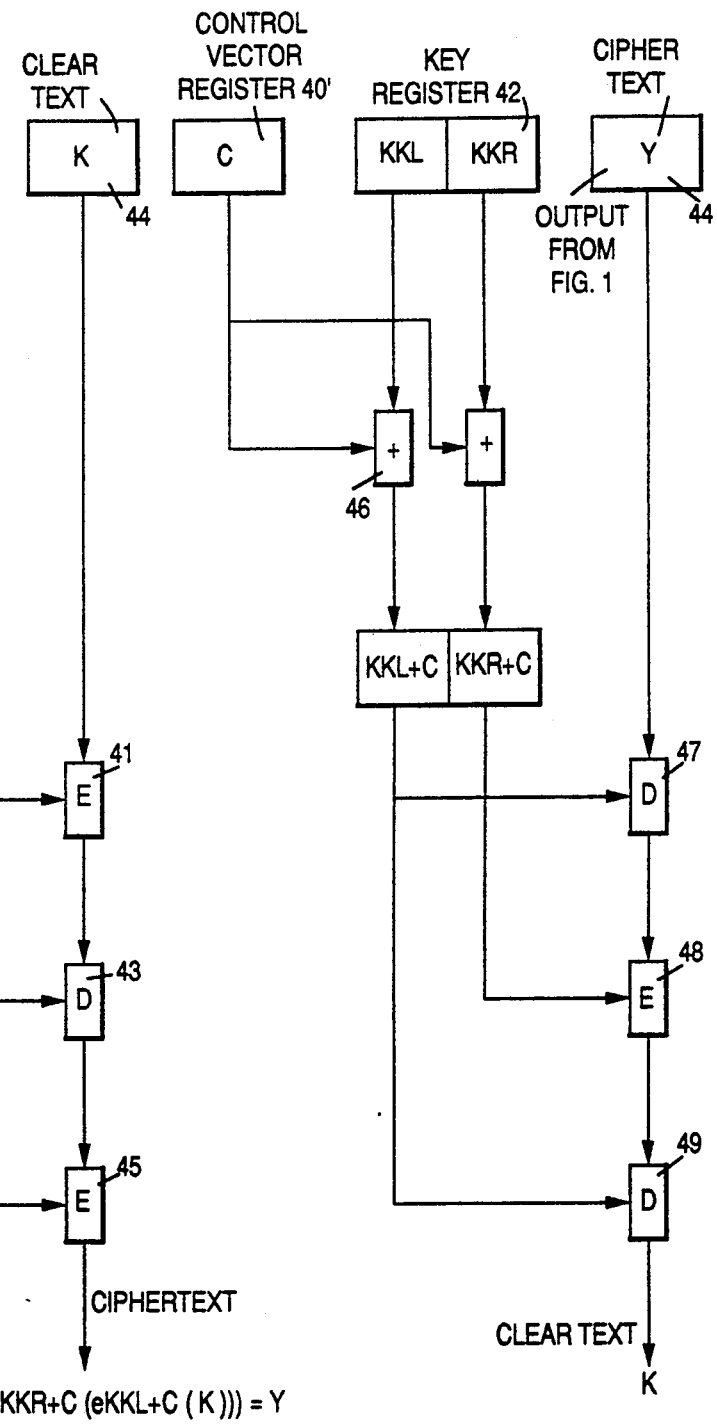

eKKL+CL ( dKKR+CR (eKKL+CL (K))) = Y   (64 BITS)

$e^*KK.Cinf\,(\,K\,) = eKKL+ML\,(dKKR+MR\,(eKKL+ML\,(\,K\,))) = Y \quad (64\ BITS\,)$

FIG. 12

| MDC ALGORITHM USING 2 ENCRYPTION OPERATIONS PER BLOCK |
|---|
| 1. PAD THE INPUT TEXT WITH X'FF' TO A MULTIPLE OF 8 BYTES.<br>2. PARTITION THE INPUT TEXT INTO <n> 8 BYTE BLOCKS T8 <1> TO T8 <n>.<br>3. IF n = 1 THEN SET n = 2 AND T8 <2> = 8 BYTES OF X'00'.<br>4. SET INITIAL VALUES OF KD1 AND KD2 ( SEE BELOW ).<br>5. FOR <i> = 1, 2, ..., n:<br>    A. MDCOP ( KD1, KD2, T8 <i>, T8 <i> )<br>    B. KD1 : = OUT1<br>    C. KD2 : = OUT2<br>6. OUTPUT THE 16 BYTE MDC : = ( KD1 \|\| KD2 ). |

FIG. 13

| MDC ALGORITHM USING 4 ENCRYPTION OPERATIONS PER BLOCK |
|---|
| 1. PAD THE INPUT TEXT WITH X'FF' TO A MULTIPLE OF 8 BYTES.<br>2. PARTITION THE INPUT TEXT INTO <n> 8 BYTE BLOCKS T8 <1> TO T8 <n>.<br>3. IF n = 1 THEN SET n = 2 AND T8<2> = 8 BYTES OF X'00'.<br>4. SET INITIAL VALUES OF KD1 AND KD2 ( SEE BELOW ).<br>5. FOR <i> = 1, 2, ..., n:<br>    A. MDCOP (KD1, KD2, T8 <i>, T8 <i> )<br>    B. KD1int : = OUT1<br>    C. KD2int : = OUT2<br>    D. MDCOP (KD1int, KD2int, KD2, KD1 )<br>    E. KD1 : = OUT1<br>    F. KD2 : = OUT2<br>6. OUTPUT THE 16 BYTE MDC : = ( KD1 \|\| KD2 ). |

FIG. 14
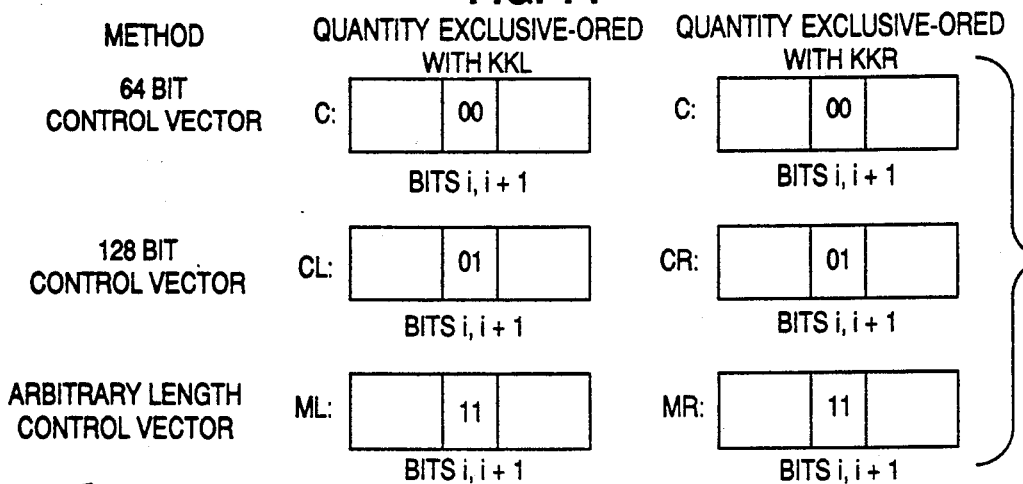
FIG. 15
(A) POSITIONAL DEPENDENT BITS AND FIELDS
(B) TAG - ORIENTED FIELD WITH LENGTH FIELD
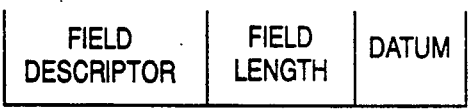
(C) TAG - ORIENTED FIELD WITH DELIMITER
(D) TAG ORIENTED CONTROL VECTOR WITH LENGTH FIELDS
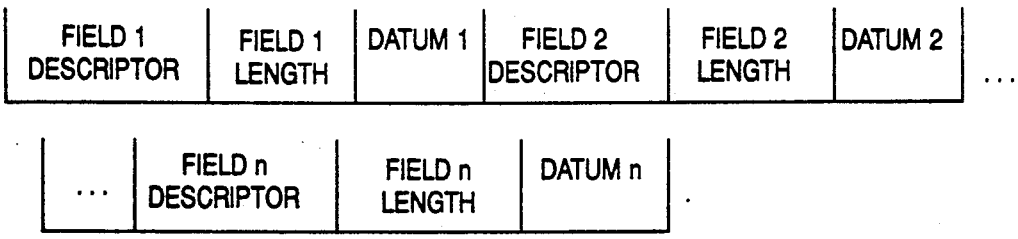
(E) TAG - ORIENTED CONTROL VECTOR WITH FIELD DELIMITERS
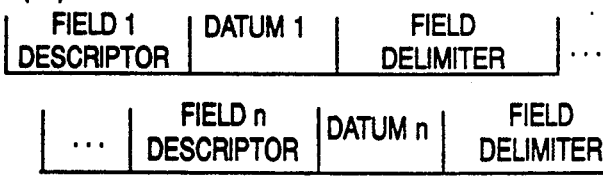
(F) MIXED FORMAT CONTROL VECTOR
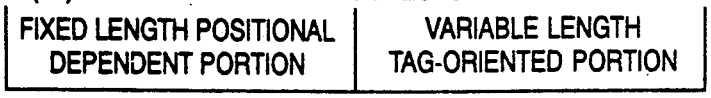

SECURE MANAGEMENT OF KEYS USING CONTROL VECTORS WITH MULTI-PATH CHECKING

This application is a file-wrapper continuation of application Ser. No. 07/344,165, filed Apr. 27, 1989, now abandoned.

BACKGROUND OF THE INVENTION

1. Technical Field

The invention disclosed broadly relates to data processing technology and more particularly relates to cryptographic applications in data processing.

2. Background Art

The following copending patent applications are related to this invention and are incorporated herein by reference:

B. Brachtl, et al., "Controlled Use of Cryptographic Keys Via Generating Stations Established Control Values," Ser. No. 55,502, filed Mar. 1987, assigned to IBM Corporation, and incorporated herein by reference, now U.S. Pat. No. 4,850,017.

S. Matyas, et al., "Secure Management of Keys Using Control Vectors," filed Aug. 11, 1988, Ser. No. 231,114, assigned to IBM Corporation, and incorporated herein by reference, now U.S. Pat. No. 4,941,176.

S Matyas, et al., "Data Cryptography Operations Using Control Vectors," filed Aug. 17, 1988, Ser. No. 233,515, assigned to IBM Corporation, and incorporated herein by reference, abandoned in a file-wrapper continuation as Ser. No. 07/401,486, now U.S. Pat. No. 4,918,728.

S. Matyas, et al., "PIN Processing Using Control Vectors," filed Aug. 26, 1988, Ser. No. 237,938, assigned to IBM Corporation and incorporated herein by reference, abandoned in a file-wrapper continuation as Ser. No. 07/398,300, now U.S. Pat. No. 4,924,514.

S. Matyas, et al., "Secure Management of Keys Using Extended Control Vectors," filed Aug. 29, 1988, Ser. No. 238,010, assigned to IBM Corporation and incorporated herein by reference, abandoned in a file-wrapper continuation as Ser. No. 07/398,299, now U.S. Pat. No. 4,924,515.

B. Brachtl, et al., "Data Authentication Using Modification Detection Codes Based on a Public One Way Encryption Function," filed Aug. 28, 1987, Ser. No. 90,633 assigned to IBM Corporation, and incorporated herein by reference, now U.S. Pat. No. 4,908,861.

D. Abraham, et al., "Smart Card Having External Programming Capability and Method of Making Same," Ser. No. 004,501, filed Jan. 19, 1987, assigned to IBM Corporation, and incorporated herein by reference, now abandoned.

The Control Vector Concept

The control vector is a compact data structure for defining the usage attributes of cryptographic keys and for controlling the distribution of cryptographic keys from one network device to another. The control vector is cryptographically coupled to the key via an encryption process such that the key can be decrypted properly only if the control vector is correctly specified to the cryptographic hardware.

FIG. 1 illustrates a system for cryptographically coupling a 64 bit control vector to a 128 bit cryptographic key, which is described in the above-referenced copending patent applications by Brachtl, et al. and Matyas, et al. Notationally, it is convenient to express encryption of plaintext X with key K as $eK(X)=Y$, where Y denotes the resulting ciphertext. The inverse process of decryption of ciphertext Y with key K to recover plaintext X is expressed as $dK(Y)=X$. The method of encrypting a 64 bit key K with a 128 bit key encrypting key KK (consisting of a left-hand 64 bit portion of the key designated KKL and a right-hand 64 bit portion of the key designated KKR) and a 64 bit control vector C in register 40' is a variation on the method of multiple encryption described in the above-referenced copending patent application by Matyas, et al; "Secure Management of Keys Using Control Vectors", and is expressed as $eKKL+C(dKKR+C(eKKL+C(K)))$ where "+" denotes an exclusive-OR function. Thus, encryption consists of first exclusive-ORing in exclusive-OR device 46 the 64 bit control vector C to KKL and KKR in register 42 and then alternately encrypting K in register 44 with KKL+C in encryption device 41, decrypting the result with KKR+C in decrypting device 43, and encrypting that result with KKL+C in encrypting device 45. Instead of writing the cumbersome form $eKKL+C(dKKR+C(eKKL+C(K)))$, a shorthand notation is used instead. The notation KK.C is used to express the exclusive-OR operation i.e., that C is exclusive-ORed with KK, or more precisely, that C is exclusive-ORed with KKL and KKR, respectively. The notation *KK is used in lieu of KK to indicate that KK is a 128 bit key instead of a 64 bit key, i.e., *KK denotes a 128 bit key whereas KK without the asterisk denotes a 64 bit key. Used together, e*KK.C(K) denotes encryption of K with a 128 bit KK where C is previously exclusive-ORed with each half of KK.

FIG. 2 illustrates the system for decrypting the encrypted value of K (i.e. $Y=e*KK.C(K)$) using key KK and control vector C. This process consists of first exclusive-ORing C with KKL and KKR, as before, and then alternately decrypting the encrypted value of K with KKL+C in decryption device 47, encrypting the result with KKR+C in encryption device 48, and decrypting that result with KKL+C in decryption device 49. It will be appreciated from a reading of FIG. 2 that K is properly recovered when KK,C and $eKKL+C(dKKR+C(eKKL+C(K)))$ are correctly specified, but that an unpredictable, and effectively random value is produced if even so much as one bit in C is incorrectly specified. (Precisely speaking, if C' is an arbitrary control vector not equal to C and ciphertext $eKKL+C(dKKR+C(eKKL+C(K)))$ is decrypted with KK and C', the is about ¼**64, which is of no cryptographic consequence. An adversary would have as good a chance to discover the clear value of K through cryptoanalysis using a straightforward method of direct search, i.e., given a plaintext and corresponding ciphertext encrypted with K, decrypt the ciphertext with every possible key until one is found that produces the given plaintext. A comparable number of encryption/decryption steps is required in both cases.)

The data encryption algorithm (DEA), as described in ANSI X3.92-1981 is one example of an encryption algorithm that can operate with control vectors using the methods of encryption and decryption described in FIG. 1 and FIG. 2. The reader will appreciate that the control vector concept can be adapted to any symmetric block cipher by specifying the control vector length to be equal to the key length, or to a multiple of it when multiple encipherment techniques are employed.

Network Configuration of Cryptographic Devices

FIG. 3 illustrates a network of connected cryptographic devices (hosts, controllers, workstations, etc.), consisting of a first cryptographic device 100 in a data processing system 2, connected to several other cryptographic devices 200, 300, etc. via a cryptographic distribution channel 1000, and which are capable of communicating cryptographically. That is, the devices can communicate privately by encrypting data at a sending device and decrypting data at a receiving device. The devices can authenticate data transmissions by generating and attaching a message authentication code to a message prepared at a sending device and authenticate the message and message authentication code at a receiving device. And the devices can generate keys securely within a cryptographic device at a generating device, encrypt the keys, and transmit the encrypted keys to a receiving device where they are received and stored in an appropriate form in the key data set belonging to the receiving device for subsequent use in encrypting and authenticating data, or for some other key management function. These and more key management procedures, protocols and methods are described in greater detail in copending patent applications by Matyas, et al. cited above.

Referring now to FIG. 4, which is an enlargement of cryptographic device 100 shown in FIG. 3, each cryptographic device contains a cryptographic facility (CF) 4 capable of executing a set of cryptographic instructions 52, a key storage 22, a cryptographic facility access program (CFAP) 54, and user application programs 55. The CF contains a register 18 for the storage of a 128 bit master key KM consisting of a left-hand 64 bit portion, denoted KML, and a right-hand 64 bit portion, denoted KMR. (It is assumed that the cryptographic algorithm implemented within the CF is the data encryption algorithm (DEA).) All keys stored outside the CF are encrypted under the master key and a control vector, as described in FIG. 1, and are stored in key storage 22. Keys in key storage 22, i.e., encrypted under the master key are in a form that can be processed by the CF, and therefore are called operational keys. Keys encrypted under other keys (called key encrypting keys, KEKs) are in a form suitable for distribution from one device to another, i.e., the keys are stored in a form suitable for export to another device or for import from another device. (Note: keys are sometimes generated and enciphered in an import form so they can be re-imported at the same device where they are generated.) Typically, each pair of devices share two KEKs: a) a first KEK (denoted KEK1) used to encrypt and transmit keys from a first device to a second device, and b) a second KEK (denoted KEK2) used to encrypt and transmit keys from the second device to the first device. At the first device, KEK1 is designated via its control vector as a KEK sender key since it is capable of encrypting keys for export to the second device, whereas KEK2 is designated via its control vector as a KEK receiver key since it is capable of decrypting keys for import from the second device. At the second device, KEK1 and KEK2 are designated oppositely, i.e., KEK1 is a KEK receiver and KEK2 is a KEK sender key. The cryptographic facility 4 also contains a random number generator 26 capable of generating 64 bit random numbers. The output of the random number generator can be read only by the CF. The cryptographic facility also contains a secure front panel interface 58 with a port 59 for attachment of a hand-held key entry device 60. The front panel also has a physical key-activated switch 61 for enabling entry of keys, including the master key, via key entry device 60. (The above-referenced copending patent application by S. Matyas, et al., "Secure Management of Keys Using Control Vectors," provides a more detailed description of the cryptographic components comprising cryptographic device 100.)

Referring again to FIG. 4, instruction set 52 consists of several cryptographic instructions capable of supporting key management, data encryption and authentication functions, and processing of financial transactions based on authentication of personal identification numbers (PINs). Copending patent applications by S. Matyas, et al., "Secure Management of Keys Using Control Vectors", "Data Cryptography Operations Using Control Vectors", and "PIN Processing Using Control Vectors," referenced above, provide a more detailed description of the three cited applications of cryptography. Typically, a request for cryptographic service originates with an application program 55. The steps necessary to satisfy the request can be traced. For example, a request can take the form of a macro call to CFAP at 62 in which one or more parameters are passed (e.g., clear and encrypted data, keys and cryptovariables, key labels used in accessing encrypted keys in key storage 22 at 65) and thereby enabling CFAP 54 to carry out the requested function. In turn, CFAP may call for CF 4 to execute one or more cryptographic instructions at 64, as necessary, in order to generate new cryptographic keys and cryptovariables, or to encipher, decipher, or re-encipher data or keys thereby producing the outputs in the appropriate encrypted or decrypted form. As a result, CFAP may store newly generated encrypted keys in key storage 22 at 65, it may return one or more values to the requesting application program at 66, or both. Condition codes from the CF to CFAP at 64 and from CFAP to the application program at 66 indicate normal or abnormal status including indications when a requested operation could and could not be performed.

Control Vectors Used for Management of Operational Keys

Since the attributes of a key are typically public, not private, i.e., are either known or can be inferred by system users, the control vector is defined as a public or nonsecret value. On the other hand, since the cryptographic keys defined to the system must be kept secret, the process of "linking" the control vector to a key must not expose the key. (Note: One aspect of the invention involves a technique for incorporating a secret password into the control vector.)

FIG. 5 illustrates linking a control vector to a key. The example given is the use of the key generate instruction KGEN, which causes a key to be generated by the cryptographic facility. The steps can be traced. In step 71, the application A calls CFAP to generate a key. Prior to issuing the KGEN instruction, CFAP builds a 64 bit control vector in step 72 specifying the attributes of the desired key to be generated. Control vector C is passed to the CF at step 73 as part of the KGEN instruction. In response, the CF generates (using a random number generator whose output can be read only by the CF) a 64 bit random number at step 75, which is adjusted for odd parity. This represents the generated key K. K is encrypted using the exclusive-OR product of the control vector C passed at 73 and master key KM accessed at 74 as indicated by the encryption rule described in FIG. 1. The encrypted key, denoted e*KM.C(K), is returned to CFAP at step 76. (Note that e*KM.C(K) is a shorthand notation for expressing multiple encryption under the variant keys KML+C and KMR+C, respectively.) In turn, CFAP may store the encrypted key e*KM.C(K) and control vector C output at 77, in the key storage 22 at step 78 (in which case a key label is returned in step 79 to the application program at step 80) or the values may be returned to a requesting application program at step 80. In any event, the reader will appreciate that the process of key generation and "linking" the control vector to the generated key via encryption is one that does not expose the generated key in cleartext form outside the cryptographic facility, whereas the control vector is maintained as a public or nonsecret value.

Although the control vector is not a secret quantity, it is necessary that it be supplied, specified, or provided as an input to the cryptographic facility anytime the key to which it is linked is to be used. Every bit in the control vector must be specified, exactly as it was specified originally when the key was generated and encrypted. Failure to specify C correctly will result in the recovery of a random, unknown key value. The recovery of a key (i.e., decryption of a key), which has been previously encrypted using a control vector, is always part of a larger process in which the encrypted key and control vector are passed as parameters of a cryptographic instruction invoked via the CFAP to CF interface. In this way, the cryptographic facility can check the control vector to ensure that the key is permitted to be used as an input parameter to the requested cryptographic instruction. This preliminary checking of the control vector is called CV checking. When more than one encrypted key and control vector are supplied as parameters to a cryptographic instruction, CV checking not only consists of checking with control vector for consistency, but cross checking values in one control vector against values in another control may be required. The steps required by the cryptographic facility to process a cryptographic instruction are traced in FIG. 6. Basically, every instruction consists of three functions: a) CV checking 81, b) key recovery 82, and c) processing the requested instruction 83. The first functional requirement is CV checking 81, which consists of checking the control vectors for consistency and to determine whether the requested usage of the key parameters is consistent with the requested instruction. If CV checking fails, the instruction execution is aborted. In all cases, a condition code is turned to CFAP indicating status information. If CV checking succeeds, the process continues. The second functional requirement is key recovery 82, i.e., decryption of encrypted keys. The method of cryptographic coupling between the control vector and the key is such that any cheating (i.e., changing bits in the control vector to give the key incorrect attributes) will result in the recovery of a random, unpredictable value for the key. In effect, the desired, needed cryptographic key is not recovered by the cryptographic instruction. The third functional requirement is that of processing the requested cryptographic instruction 83. If the control vectors and keys have been correctly specified, the instruction is processed correctly. However, if cheating occurs, the instructions are designed so that the instruction outputs are of no beneficial value. Copending patent application by S. Matyas, et al., "Secure Management of Keys Using Control Vectors," referenced above provides a more detailed description of the processes of CV checking, key recovery, and instruction execution.

The degree of key management control offered by the control vector is related to and depends largely on the number of bits that are available in the control vector. An especially short control vector, say from 10 to 50 bits, would have a very limited use and could support only a limited number of key management separations, usages, and controlling mechanisms. Copending patent application by S. M. Matyas, et al., "Secure Management of Keys Using Extended Control Vectors," as referenced above, shows how control vectors in excess of 64 bits may be used advantageously in a variety of sophisticated applications for controlling cryptographic key usage.

Double Length Control Vectors

FIG. 7 and FIG. 8 illustrate how a 64 bit control vector, shown in FIG. 1 and FIG. 2, can be advantageously extended to a 128 bit control vector.

The system of FIG. 7 differs from the system of FIG. 1 as follows. With the system of FIG. 7, CL in register 40L is exclusive-ORed in exclusive-OR 46L with KKL in register 42L to form KKL+CL and CR in register 40R is exclusive-ORed in exclusive-OR 46L with KKR in register 42R to form KKR+CR. With the system of FIG. 1, C is exclusive-ORed with KKL and KKR to form KKL+C and KKR+C, respectively. Thus, with the system of FIG. 1, the same 64 bit control vector is exclusive-ORed with both parts of KK, whereas with the system of FIG. 7, different 64 bit control vectors are exclusive-ORed with each part of KK. Otherwise, the system of FIG. 1 and FIG. 7 are the same.

For convenience, the notation e*KK.C64(K) distinguishes the case where a 64 bit control vector is used with KK to encrypt K in FIG. 1 and the notation e*KK.C128(K) distinguishes the case where a 128 bit control vector is used with KK to encrypt K in FIG. 7. The output value Y in FIG. 1 is an example where Y can be expressed as Y =e*KK.C64(K). Likewise, the output value Y in FIG. 7 is an example where Y can be expressed as Y =e*KK.C128(K).

The system of FIG. 8 differs from the system of FIG. 2 as follows. With the system of FIG. 8, CL in register 40L is exclusive-ORed in exclusive-OR 46L with KKL in register 42L to form KKL+CL and CR in register 40R is exclusive-ORed in exclusive-OR 46R with KKR in register 42R to form KKR+CR. With the system of FIG. 2, C is exclusive-ORed with KKL and KKR to form KKL+C and KKR+c, respectively. Thus, the difference between FIG. 2 and FIG. 8 is that different 64 bit control vectors are exclusive-ORed with each part of KK.

The reader will appreciate that the system of FIG. 1 and FIG. 2 is just the system of FIG. 7 and FIG. 8 where C=CL=CR. In other words, the method of employing a 128 bit control vector reduces to that of employing a 64 bit control vector provided that the left-hand 64 bit portion of C equals to the right-hand portion of C. Thus, a 64 bit control vector is just a degenerate case of a 128 bit control vector. The advantage of the system of FIG. 7 and FIG. 8 is that the control vector length is doubled without any additional computational or processing overhead. In fact, the definitions for a 64 bit control vector (FIG. 1 and FIG. 2) and a 128 bit control vector (FIG. 7 and FIG. 8) have architectural and implementation advantages. Existing cryptographic hardware and software implementing 64 bit control vectors can be easily extended to support 128 bit control vectors, since both systems are implemented using a triple encryption operation involving variant keys derived from KKL and KKR. Otherwise, the encryption processes are exactly the same. New cryptographic hardware and software implementing 128 bit control vectors can easily support 64 bit control vectors by merely setting CL=CR at the software level. In effect, both 64 and 128 bit control vectors can be made transparent to the cryptographic hardware.

Arbitrary Length Control Vectors

FIG. 9 and FIG. 10 illustrate how a 64 bit control vector, shown in FIG. 1 and FIG. 2, can be advantageously extended to a control vector of arbitrary length. The unlimited number of bits provided by this system offers the maximum degree of cryptographic key management control possible.

FIG. 9 illustrates the system for encrypting a 64 bit cryptographic key K in register 44 with a 128 bit key encrypting key KK which is KKL concatenated with KKR (KK=KKL//KKR) in register 42 and a control vector C of arbitrary, or infinite, length (denoted Cinf) in register 90. The operation consists of first calculating a one-way public hash function on Cinf in hash function processor 92 to produce a 128 bit hash value result consisting of a left-hand 64 bit part denoted ML loaded into register 94L and a right-hand 64 bit part denoted MR loaded into register 94R. The one-way function computed in processor 92 has the property that it is computationally infeasible to calculate the input to the function from the function's output, but it is easy to calculate an output from an input. One-way functions are well-known and have been described in prior art. The definition of a strong one-way function is given below, from W. Diffie, et al. entitled "New Directions in Cryptography," *IEEE Transactions on Information Theory*, IT-22, No. 6, pp. 644-654 (1976).

A function f is a one-way function if, for any argument x in the domain of f, it is easy to compute the corresponding value y=f(x); yet for almost all y in the range of f, it is computationally infeasible, given a value of y and knowledge of f, to calculate any x whatsoever with the property that f(x)=y. It is important to note that a function is defined which is not invertible from a computational point of view, but whose noninvertibility is entirely different from that normally encountered in mathematics. A function f is normally called "noninvertible" when the inverse of a point y is not unique; i.e., there exist distinct points x1 and x2 such that f(x1)=y=f(x2). This is not the sort of inversion difficulty that is required here. Rather, it must be overwhelmingly difficult, given a value y and knowledge of f, to calculate any x whatsoever with the property that f(x)=y.

The algorithm for calculating a Modification Detection Code (see FIG. 11, FIG. 12, and FIG. 13), described below, provides an even stronger definition of a one-way function. The MDC algorithm is such that it is computationally infeasible to find an x1 and x2 such that f(x1)=f(x2). In order to satisfy this stronger requirement, it is necessary for the MDC to be at least 128 bits in length. Otherwise, birthday-type attacks can be employed to find an x1 and x2 such that f(x1)=f(x2).

Continuing with the system of FIG. 9, the operation next consists of exclusive-ORing with exclusive-OR 46L the 64 bit value ML in register 94L with the 64 bit key KKL in register 42L and exclusive-ORing with exclusive-OR 46R the 64 bit value MR in register 94R with the 64 bit key KKR in register 42R. K in register 44 is then alternately encrypted with KKL+ML in encryption device 41, decrypted with KKR+MR in decryption device 43, and encrypted with KKL+ML in encryption device 45. The resultant value Y is denoted e*KK.Cinf(K) for convenience. (The "+" denotes the exclusive-OR operation.)

FIG. 10 illustrates the system of decrypting the 64 bit value Y which is the encrypted cryptographic key K in register 44 with a 128 bit key encrypting key KK (KKL,KKR) in register 42 and a control vector Cinf of arbitrary length in register 90. The steps in FIG. 10 are basically the inverse of those in FIG. 9. The operation consists of first calculating a one-way public hash function of Cinf (using the same one-way public hash function as used in FIG. 9) in the hash function processor 92 to produce a 128 bit result ML,MR. The operation next consists of exclusive-ORing ML with KKL and MR with KKR, respectively, to produce KKL+ML, KKR+MR. K is then alternately decrypted with KKL+ML in decryption device 47, encrypted with KKR+MR in encryption device 48, and decrypted with KKL+ML in decryption device 49. In effect, e*KK.Cinf(K) is decrypted with *KK.Cinf to recover K.

The preferred method of calculating a one-way public hash function in the processor 92 is to make use of the algorithms for calculating Modification Detection Codes (MDCs) described in copending patent application, Ser. No. 090,633, "Data Authentication Using Modification Detection Codes Based on a Public One-Way Encryption Function," by B. Brachtl, et al. reference above. FIG. 11 describes the primitive MDC operation, MDCOP, which is applied in two different systems to calculate an MDC. FIG. 12 illustrates the calculation of a 128 bit MDC using a method requiring two encryption operations per 64 bit input. FIG. 13 illustrates the calculation of a 128 bit MDC using a method requiring four encryption operations per 64 bit input. Both methods require the input a plaintext control vector of arbitrary length to be divided into 64 bit blocks, where padding of the final blocks with hexadecimal digits X'FF' is performed as necessary to ensure that every block has 64 bits. The plaintext blocks are processed serially by the MDC algorithm until all blocks are processed. The output of the function is a 128 bit MDC.

In the case of Cinf, the control vector is divided into blocks C1, C2, . . . , Cn where Cn is padded on the right with hexadecimal 'FF' (with as many bytes of "FF" as necessary) to make Cn eight bytes. The padding step is performed, as necessary by the cryptographic hardware (i.e. it is an integral part of the one-way public hash function itself). Blocks C1, C2, . . . , Cn are then operated on with the MDC algorithm (either the two encryption or four encryption per block method) to produce a 128 bit MDC. The left-hand part of the 128 bit MDC (denoted ML) is exclusive-ORed with KKL to form KKL+ML and the right-hand part of the 128 bit MDC (denoted MR) is exclusive-ORed with KKR to form KKR+MR.

It is very important for maximum security that a strong one-way function, such as the MDC algorithm, be employed to calculate the so-indicated 128 bit hash value on the arbitrary length control vector. This is necessary to prevent an adversary from finding two different valid control vectors C1 and C2, which yield the same hash value. If such a pair, C1 and C2, could be found, where MDC(C1)=MDC(C2), then the integrity of the process would be violated. To illustrate why this is so, consider an example where C1 permits encipher only of data and C2 is some control vector which, among other things, permits decipher of data. Now, if it is known that an encrypted data key has control vector C1, then security is easily subverted by any insider by simply specifying C2 instead of C1. That is, the adversary passes the encrypted data key and C2 to a decipher instruction, together with intercepted ciphertext that has been enciphered with the subject data key by the unsuspecting user, and the decipher instruction is unable to detect that C2 is invalid or unable to prevent the correct data key from being recovered internally within the CF and consequently unable to prevent the data from being decrypted.

FIG. 22 is provided to show how the hash function processor 92 can be connected to the bus 12 in the cryptographic facility 4. Although the hash function processor 92 can be a part of the cryptographic processing unit 16, it can also be a separate processor connected to the bus 12. The hash function processor 92 performs the one-way public hash function described above, on the control vector.

Cryptographic Separation Among Control Vectors

The reader will appreciate that a cryptographic implementation based on 64 bit control vectors only, or 128 bit control vectors only, or arbitrary length control vectors only can be securely implemented using methods prescribed herein and as defined to this point in the invention. However, systems may exist where it is desired, and even necessary for the methods to coexist (i.e. to be implemented within the same cryptographic system), the methods must be separated cryptographically.

Let C64, C128 and Cinf denote the methods of encrypting a key K with KK using a 64 bit control vector, a 128 bit control vector, and an arbitrary length control vector, respectively. Let i denote any of these methods, and let Y denote the encrypting of K with KK using control method i. Now if j denotes any one of the methods such that i does not equal j, then the cryptographic hardware must be such that the following holds true. If Y and j are passed to the hardware (i.e., the insider adversary lies and says method j was used when in fact method i was used), then the cryptographic hardware must ensure that cheating is discovered and the operation is aborted, or else the cryptographic hardware must ensure that a random, unpredictable value K' (equal to K only by pure chance) is produced which is of no use or value to an adversary.

A method for achieving cryptographic separation among the three methods of control vector definition is illustrated in FIG. 14. The method makes use of a two bit field (say bits i and i+1) in each 64 bit part of each control vector and in each 64 bit part of the MDC calculated on an arbitrary length control vector. The bits are assigned values such that for a given K and KK, the set of all C64 is different from the set of all C128 is different from the set of all 128 bit MDC values calculated on all Cinf.

Tag-Oriented and Positional Dependent Control Vector Data Structures

For a control vector C of arbitrary length, two possible architectural specifications exist. Firstly, C will admit a specification where the field information in C is positional (i.e., it depends on its position relative to a left- or right-hand origin point). Secondly, C will admit a tag-oriented specification wherein the fields in C consist of a tag and a datum. In such a specification, the fields are not positional, but can occur in any order. Moreover, only those fields required for managing and controlling a key need to be specified in the control vector. Mixtures of positional and tag-oriented specifications are possible, and are embraced within the definition of the arbitrary length control vector. These and other methods are described in greater detail in copending patent application "Secure Management of Keys Using Extended Control Vectors," by Matyas, et al., referenced above.

Control Vector Checking

FIG. 16 gives a block diagram representation of the data processing system with the cryptographic facility therein. In FIG. 16 the data processing system 2 executes a program such as the crypto facility access programs and the application programs illustrated in FIG. 4. These programs output cryptographic service requests for the management of the cryptographic keys which are associated with control vectors. Control vectors define the function which the associated key is allowed by its originator to perform. The cryptographic facility validates that key management functions requested for a cryptographic key by the program have been authorized by the originator of the key.

As is shown in FIG. 16, contained within or associated with the data processing system 2 is a cryptographic facility 4 which is characterized by a secure boundary 6. An input/output path 8 passes through the secure boundary 6 for receiving the cryptographic service request, cryptographic keys and their associated control vectors from the program. The input/output 8 outputs responses to those cryptographic requests from the cryptographic facility. Included within the secure boundary 6 is a cryptographic instruction storage 10 which is coupled by units of the bus 12 to the input/output path 8. A control vector checking unit 14 is coupled to the instruction in storage 10 and a cryptographic processing unit 16 is also coupled to the instruction storage 10. A master key storage 18 is coupled to the cryptographic processing unit 16. The cryptographic facility 4 provides a secure location for executing key management functions in response to the received service request.

The cryptographic instruction storage 10 receives over the input/output path 8 a cryptographic service request for performing a key management function with a cryptographic key. The control vector checking unit 14 has an input coupled to the input/output path 8, for receiving a control vector associated with the cryptographic key. The control vector checking unit 14 also has an input connected to the cryptographic instruction storage 10, for receiving control signals to initiate checking that the control vector authorizes the key management function which is requested by the cryptographic service request.

The control vector checking unit 14 has an authorization output 20 which is connected to an input of the cryptographic processing unit 16, for signaling that key management function is authorized, the receipt of the authorization signal by the cryptographic processing unit 16 initiates the performance of the requested key management function with the cryptographic key. A cryptographic key storage unit 22 is coupled to the cryptographic facility 14 over the input/output path 8. The cryptographic key storage unit 22 stores the cryptographic key in an encrypted form in which the cryptographic key is encrypted under a storage key which is a logical product of the associated control vector and the master key stored in the master key storage 18.

An example of recovering an encrypted key from the cryptographic key storage 22 occurs when the cryptographic instruction storage 10 receives over the input/output path 8 a cryptographic service request for recovering the cryptographic key from the cryptographic key storage unit 22. The control vector checking unit 14 will then output in response thereto, an authorization signal on line 20 to the cryptographic processing unit 16 that the function of recovering the cryptographic key is authorized. The cryptographic processing unit 16 will then operate in response to the authorization signal on line 20, to receive the encrypted form of the cryptographic key from the cryptographic key storage 22 and to decrypt the encrypted form under the storage key which is a logical product of the associated control vector and the master key stored in the master key storage 18.

The storage key is the exclusive-OR product of the associated control vector and the master key stored in the master key storage 18. Although the logical product is an exclusive OR operation in the preferred embodiment, it can also be other types of logical operations.

The associated control vector is stored with the encrypted form of its associated cryptographic key in the cryptographic key storage 22. Since all keys stored in the cryptographic storage are encrypted under the master key, a uniform method for encryption and decryption of encrypted keys thereon can be performed.

The associated control vector includes fields defining the authorized types of cryptographic functions, including key management functions, data encryption/decryption functions and personal identification numbers (PIN) processing functions, as more fully described in copending patent applications by Matyas, et al. cited above.

Control vector checking for a 128 bit control vector is similar to control vector checking for a 64 bit control vector, except that the checking can involve any of the 128 bits whereas for a 64 bit control vector it can involve any of the 64 bits. Thus, the control vector checking logic as detailed in FIG. 6 for a 64 bit control vector is similar to the control vector checking logic that is needed for a 128 bit control vector, except that 128 bait control vectors are provided as inputs to the cryptographic facility instead of 64 bit control vectors.

Control vector checking for a control vector of arbitrary length is similar. That is, checking is still based on the control vector, except now a very long control vector can be present and many more control vector bits and fields may need to be tested. When a control vector of arbitrary length is employed, control vector checking is always based on the control vector—not on the 128 bit hashed, one-way function of the control vector. This hashed value is calculated internally to the cryptographic facility only and there is no requirement for this hashed value to exist outside the cryptographic facility only and there is no requirement for this hashed value to exist outside the cryptographic facility for the purpose of communicating it from one device to another, or from one cryptographic facility to another, or for the purpose of storing it like a control vector and reentering it into the cryptographic facility. (Although, certainly, there is no loss in security if the hashed value of the control vector is known outside the cryptographic facility, since the hashing algorithm and the control vector are presumed to be publicly known, nonsecret components, except in situations where secret values are specifically incorporated into the control vector (such as a secret password).

The method of control vector checking, as described in FIG. 16, is based on a method whereby the control vector checking routine is performed at a single point by a single control vector checking unit within the secure boundary of a single cryptographic facility. It furthermore assumes that a single control signal, or authorization signal, from the control vector checking unit to the cryptographic processing unit is the sole basis for enabling the execution of a requested cryptographic instruction by the cryptographic processing unit. However, performing control vector checking only within a single control vector checking unit or at a single site for key processing, limits the flexibility of cryptographic applications depending on the controlled usage of cryptographic keys. Conversely, by dividing control vector checking among two or more devices gives rise to many different and advantageous architectural and design methodologies for improved key usage control, improved performance, and lower product costs. New and better methods for implementing control vector checking will therefore permit new and better cryptographic hardware and software product designs, where sophisticated and leading-edge methods for controlling key usage are absolutely essential for ensuring security.

OBJECTS OF THE INVENTION

It is an object of the invention to provide an improved method for the management of cryptographic keys.

It is another object of the invention to provide an improved method for the management of cryptographic keys which is more flexible than methods described by the prior art and which has equivalent or improved cryptographic security.

It is another object of the invention to provide an improved method for the management of cryptographic keys that permits new and improved cryptographic services to be offered to cryptographic system users.

It is another object of the invention to provide an improved method of control vector checking which permits control vector checking to be performed at multiple cryptographic devices at different geographical locations, but connected via a common network, and to execute a requested cryptographic function only if control vector checking succeeds at each such device.

It is another object of the invention to provide a method of multi-path control vector checking suitable for implementation on a parallel processor or connection machine, with improved performance, and to execute a requested cryptographic function at a designated device only if control vector checking succeeds everywhere.

It is another object of the invention to provide improved decision mechanisms for deciding when, and under what conditions, a requested cryptographic instruction should be executed, where the decision is based on a set of ballots, or votes (i.e., yes or no votes), representing the outcomes of the control vector checking performed by a multiplicity of different cryptographic facilities or devices (e.g., all must be yes, a majority must be yes, some votes have priority or count more heavily).

It is another object of the invention to provide an improved method of key management which permits users to control the usage of cryptographic keys via a designated user field in the control vector.

It is another object of the invention to provide an improved method of key management which permits users to control the usage of cryptographic keys via a designated user field in the control vector, wherein control vector checking of the user field is performed via a user-written exit in the cryptographic facility access program (CFAP).

It is another object of the invention to provide an improved method of key management which permits users to control the usage of cryptographic keys via a designated user field in the control vector wherein control vector checking of the user field is performed via a portable user-supplied "smart" card electronically coupled to the cryptographic facility of a companion cryptographic device (e.g., workstation, controller, or host).

SUMMARY OF THE INVENTION

These and other objects, features and advantages are accomplished by the invention disclosed herein. An apparatus and method are disclosed for validating that a cryptographic function requested to be performed with a cryptographic key has been authorized by the originator of the key. The invention is used in a data processing system which processes cryptographic service requests for the performance of cryptographic functions with cryptographic keys which are associated with control vectors defining the functions which each key is allowed by its originator to perform.

The invention includes a cryptographic facility characterized by a secure boundary through which passes an I/O path for receiving a cryptographic key and its associated control vector, and for providing a response thereto, there being included within the boundary a cryptographic processing means coupled to the I/O path and a master key storage coupled to the processing means, for providing a secure location to execute a cryptographic function with the cryptographic key.

In accordance with the invention, a first control vector checking means has an input to receive at least a first portion of the associated control vector and to receive a cryptographic service request to perform the cryptographic function with the cryptographic key, for performing a first check of the first portion of the associated control vector to determine if the cryptographic function is authorized to be performed by the cryptographic key. The first control vector checking means has a first authorization output coupled to the cryptographic processing means, for outputting a first authorization signal that the cryptographic function is authorized to be performed by the cryptographic key.

Further in accordance with the invention, a second control vector checking means has an input to receive at least a second portion of the associated control vector and to receive a cryptographic service request to perform the cryptographic function with the cryptographic key, for performing a second check of the second portion of the associated control vector to determine if the cryptographic function is authorized to be performed by the cryptographic key. The second control vector checking means has a second authorization output coupled to the cryptographic processing means, for outputting a second authorization signal that the cryptographic function is authorized to be performed by the cryptographic key.

The cryptographic processing means initiates the execution of the cryptographic function with the cryptographic key in response to receiving the first and second authorization signals.

In this manner, distributed control vector checking operations are enabled for multiprocessing, remote terminal, smart card and multiprogramming applications.

DESCRIPTION OF THE DRAWINGS

These and other objects, features and advantages of the invention will be more fully appreciated with reference to the accompanying figures.

FIG. 1 is a block diagram description of the method of encrypting a 64 bit cryptographic key K with a 128 bit key encrypting key KK (consisting of a left-hand 64 bit portion of the key designated KKL and a right-hand 64 bit portion of the key designated KKR) and a 64 bit control vector C.

FIG. 2 is a block diagram description of the method of decrypting a 64 bit cryptographic key K (previously encrypted using the method of FIG. 1) with a 128 bit key encrypting key KK and a 64 bit control vector C.

FIG. 12 describes the two-encryptions per block Modification Detection Code (MDC) algorithm.

FIG. 13 describes the four-encryptions per block Modification Detection Code (MDC) algorithm.

FIG. 14 illustrates a method to cryptographically separate the three CV methods: 64 bit CV, 128 bit CV, and arbitrary length CV. The control vector quantities to be exclusive-ORed with the key encrypting key KKL, KKR are identified for each method. A fixed bit field within these quantities is defined along with the unique encodings used to separate the three methods.

FIG. 15, parts (a) through (f), describe data structures for control vectors of arbitrary length.

DESCRIPTION OF THE BEST MODE FOR CARRYING OUT THE INVENTION

Overview of Invention

Control Vector Field Independence

Figure 3:
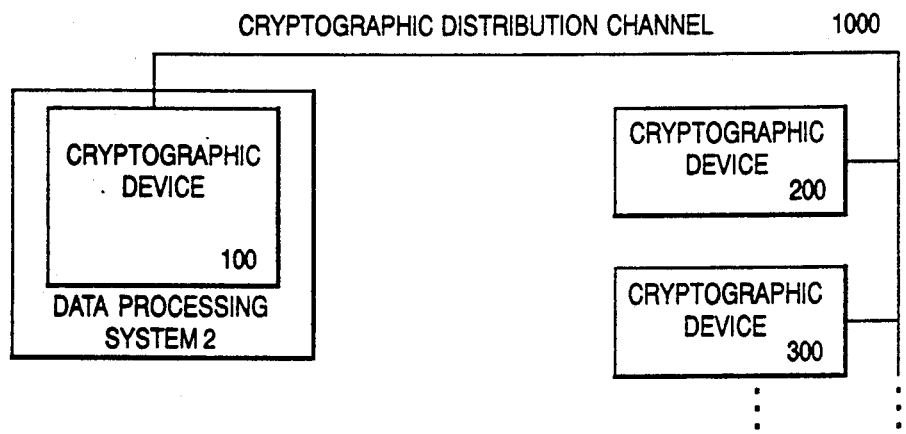
FIG. 3 is a block diagram illustrating a network of cryptographic devices connected via a cryptographic distribution channel.
Figure 4:
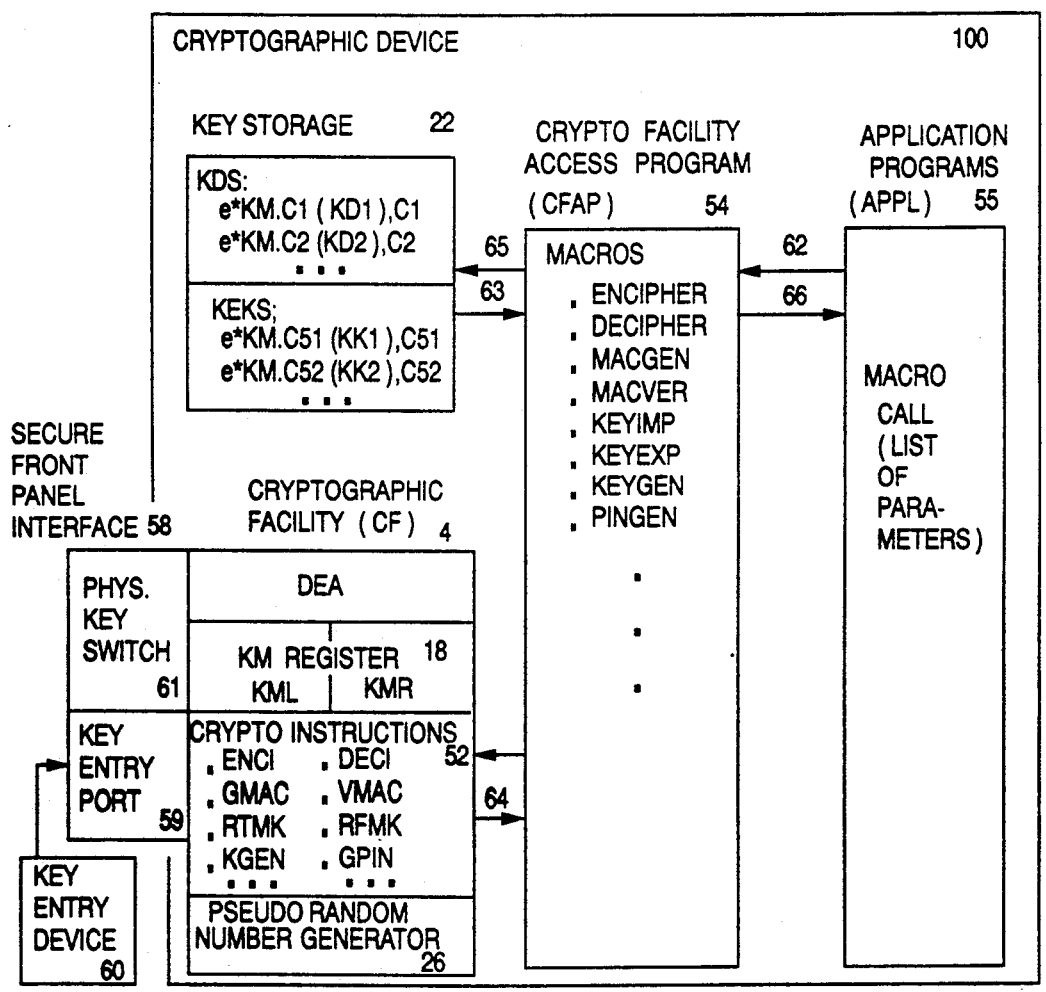
FIG. 4 is a block diagram describing the basic components within a cryptographic device.
Figure 5:
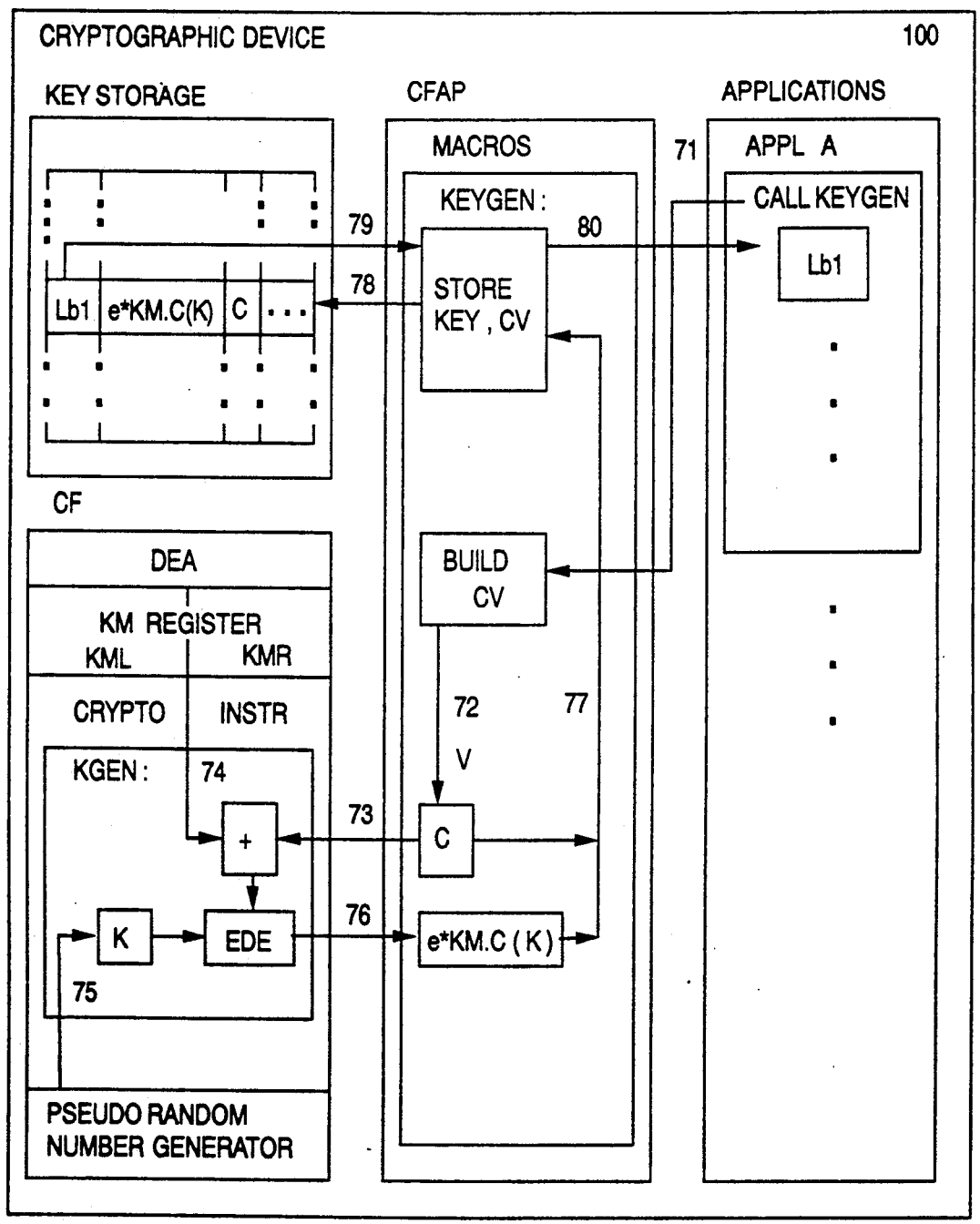
FIG. 5 is a block diagram illustrating a sequence of processes within the components of a cryptographic device to generate a key K in operational form. K is encrypted using the master key KM and control vector C, and is stored in key storage. The application may access the operational key K via an index, or label, associated with the key in storage.
Figure 6:
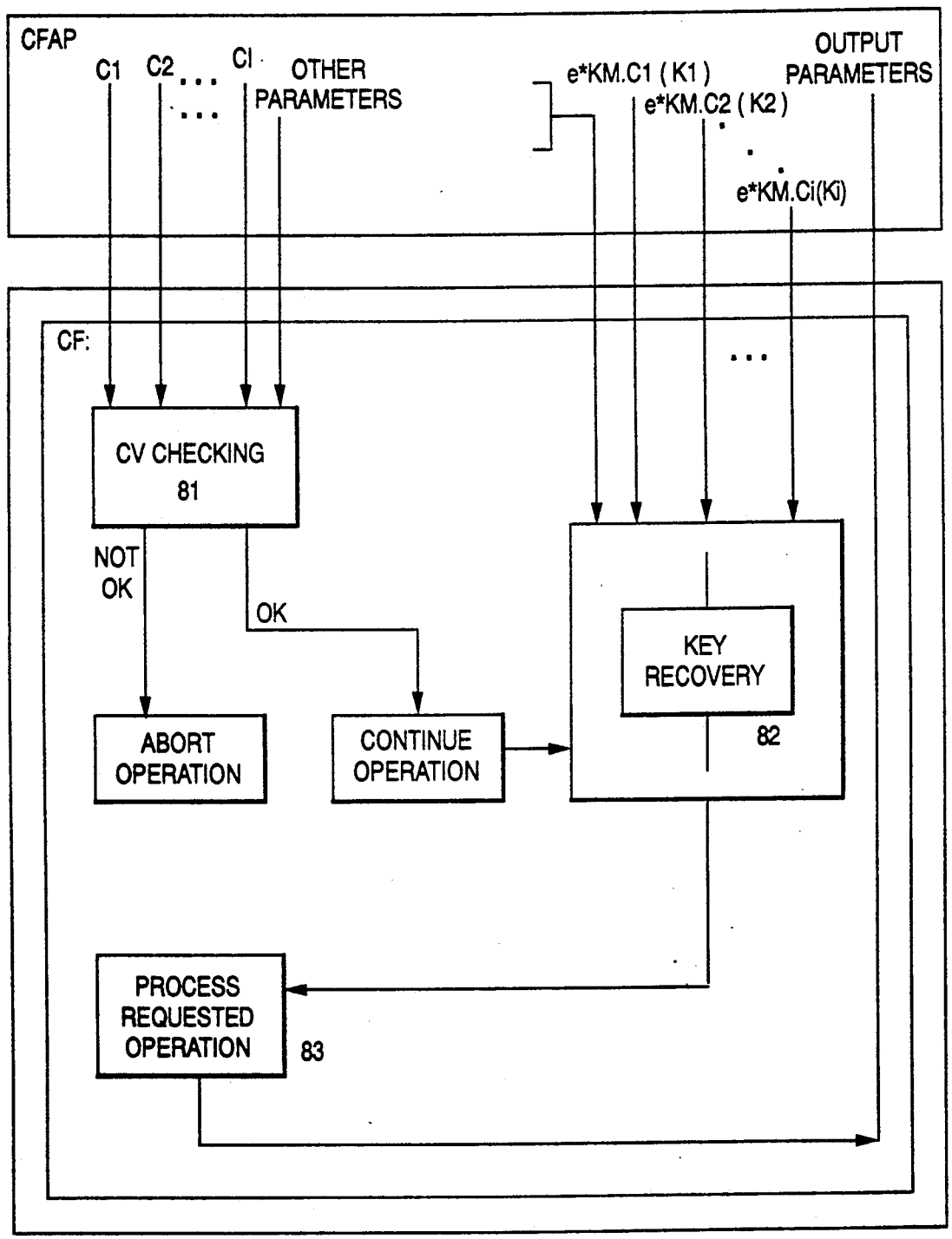
FIG. 6 is a block diagram description of the common processes performed by the cryptographic instructions within the CF.
Figure 7:
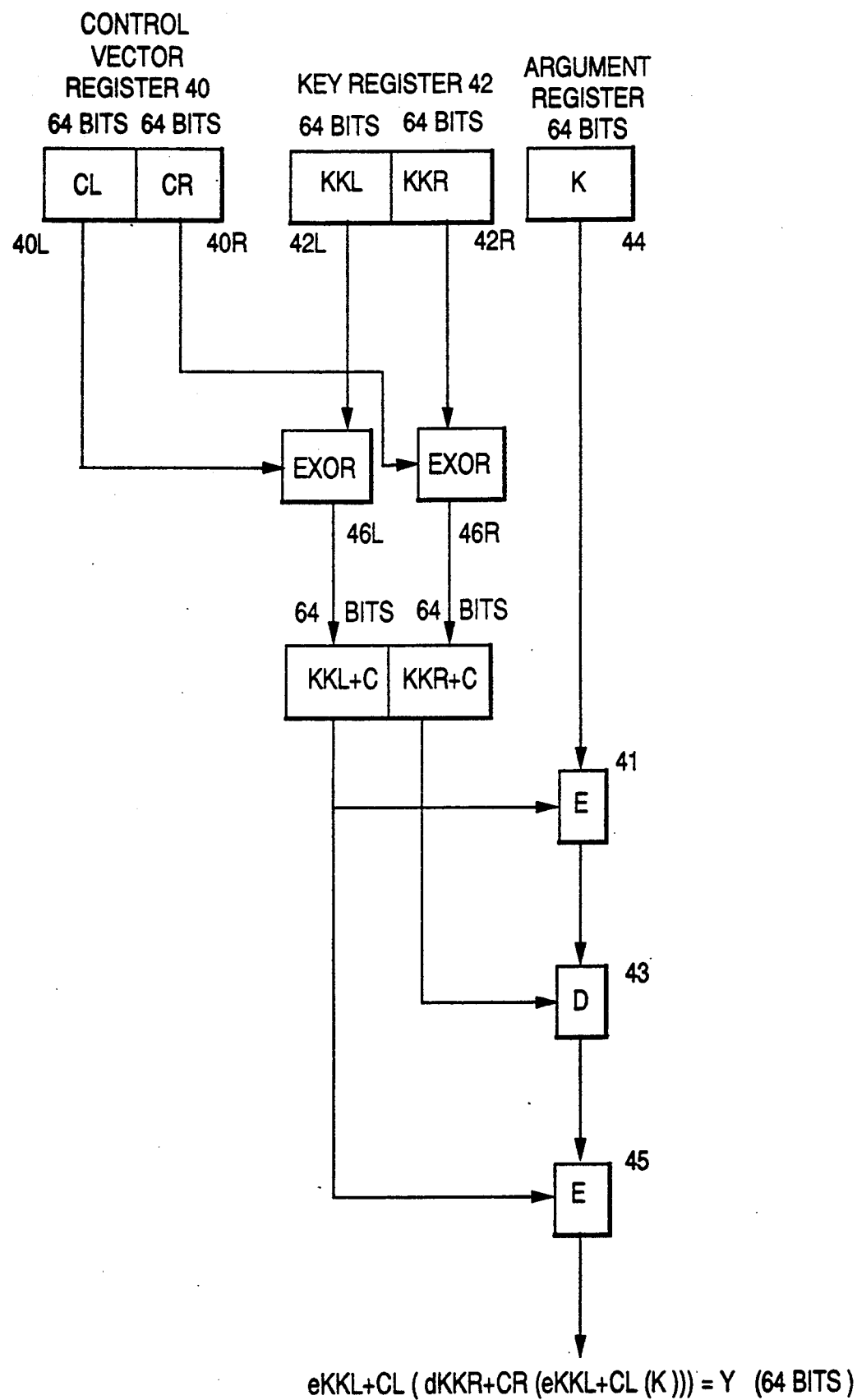
FIG. 7 is a block diagram description of the method of encrypting a 64 bit cryptographic key K with a 128 bit key encrypting key KK (consisting of a left-hand 64 bit portion of the key denoted KKL and a right-hand 64 bit portion of the key denoted KKR) and a 128 bit control vector C (consisting of a left-hand 64 bit portion denoted CL and a right-hand 64 bit portion denoted CR).
Figure 8:
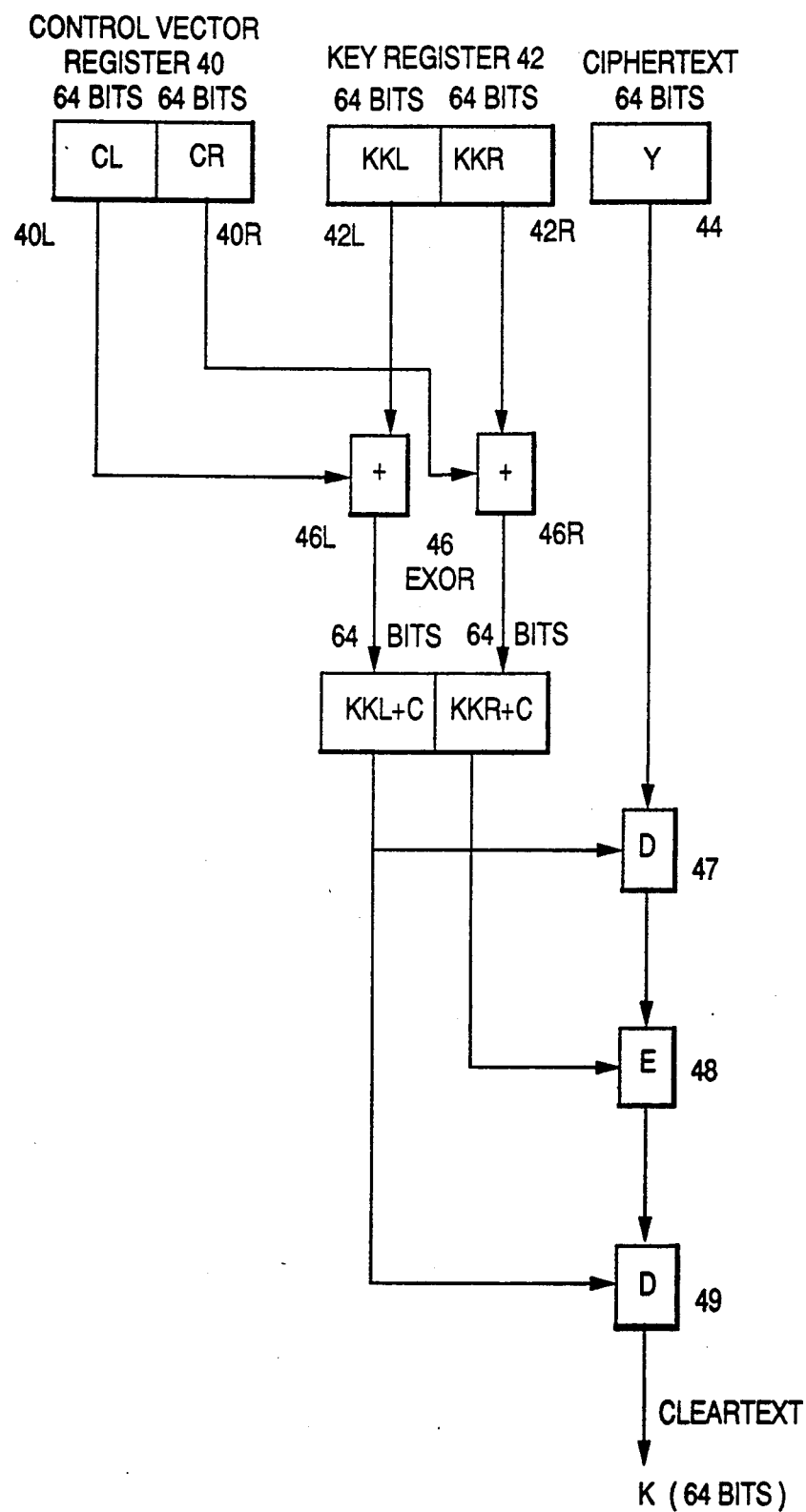
FIG. 8 is a block diagram description of the method of decrypting a 64 bit cryptographic key K (previously encrypted using the method of FIG. 7, i.e., using a 128 bit control vector and 128 bit key encrypting key).
Figure 9:
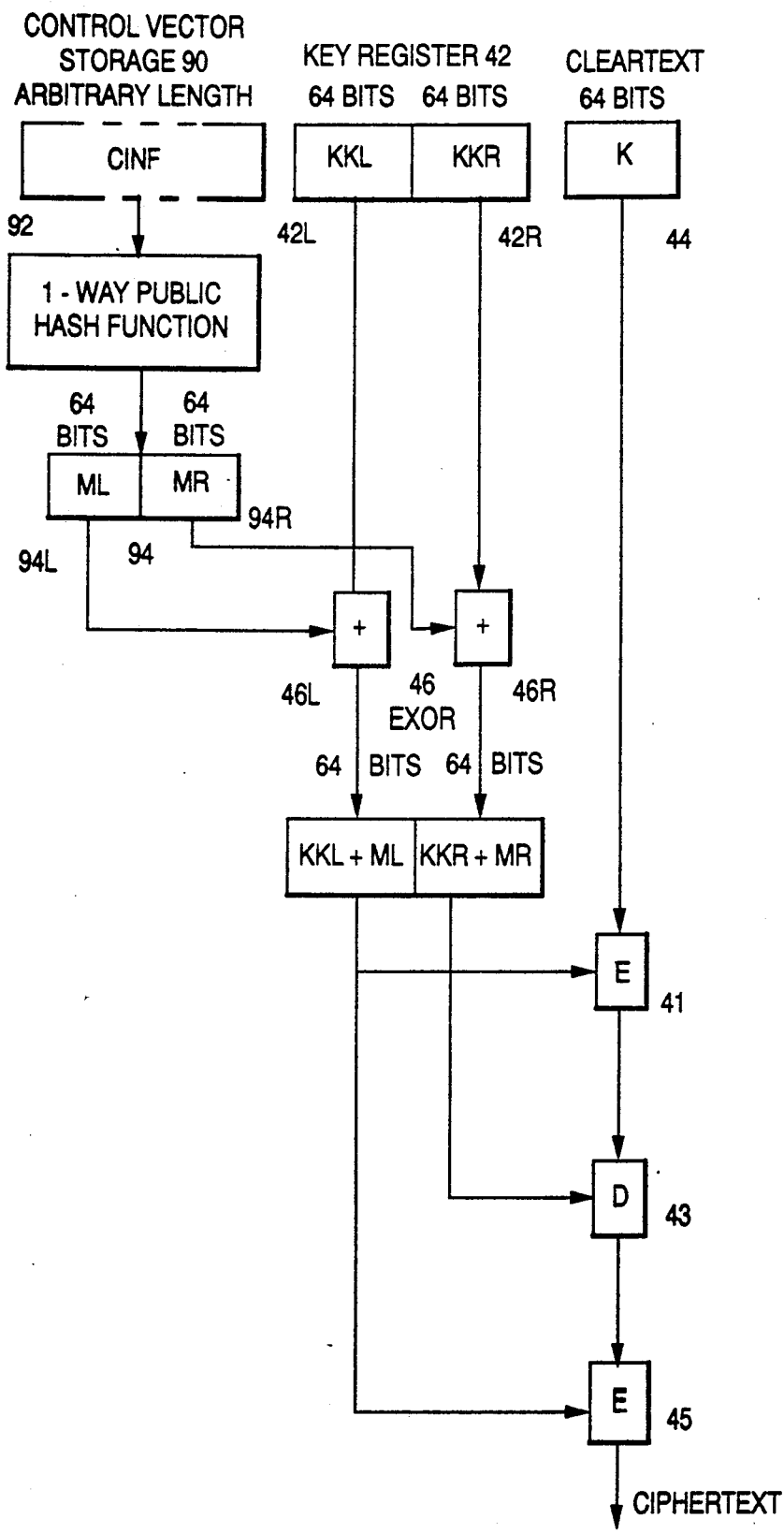
FIG. 9 is a block diagram description of the method of encrypting a 64 bit cryptographic key K with a 128 bit key encrypting key KK (consisting of a left-hand 64 bit portion of the key denoted KKL and a right-hand 64 bit portion of the key denoted KKR) and an arbitrary length control vector Cinf.
Figure 10:
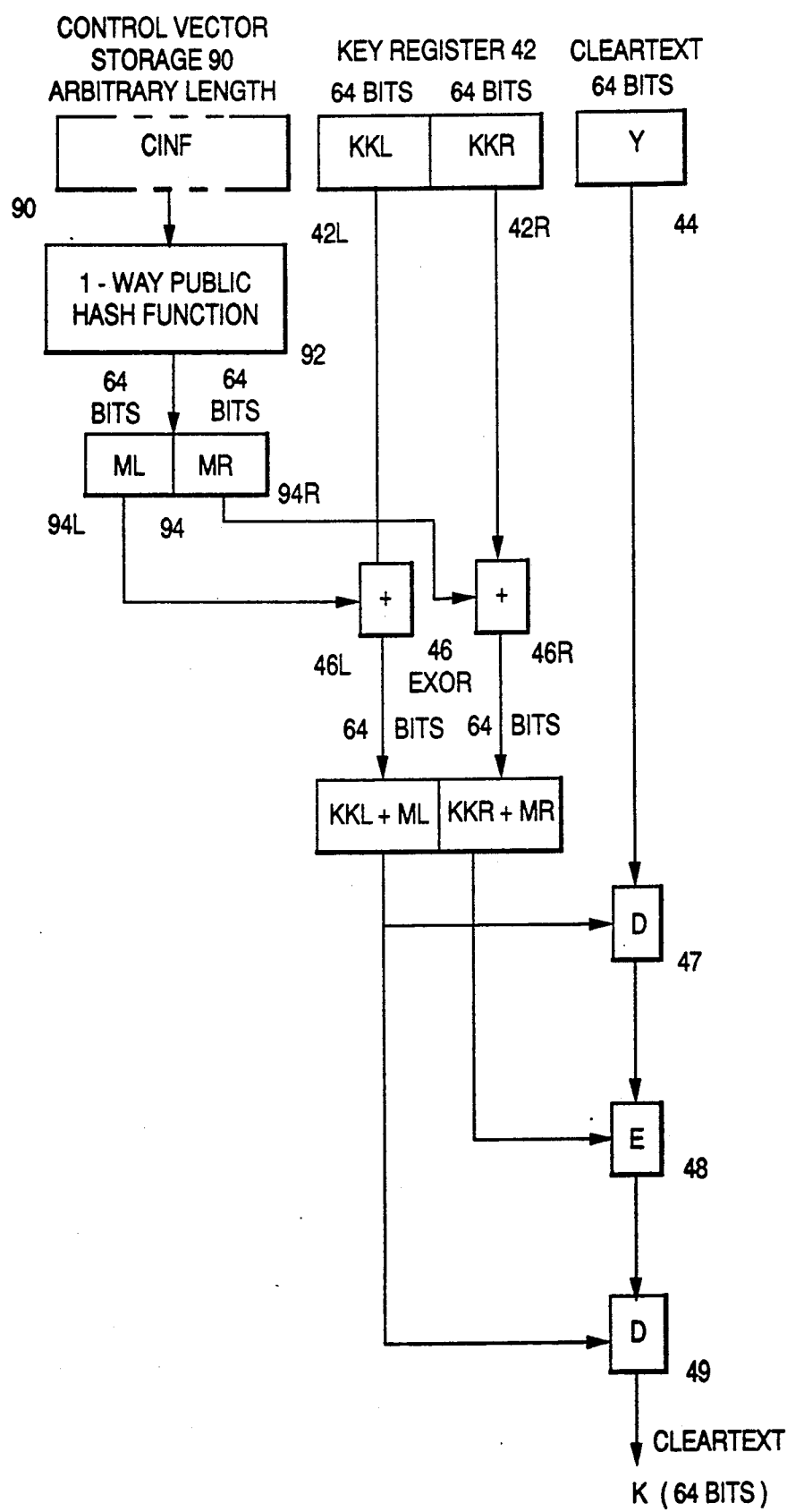
FIG. 10 is a block diagram description of the method of decrypting a 64 bit cryptographic key K (previously encrypted using the method of FIG. 9, i.e. using an arbitrary length control vector and 128 bit key encrypting key).
Figure 11:
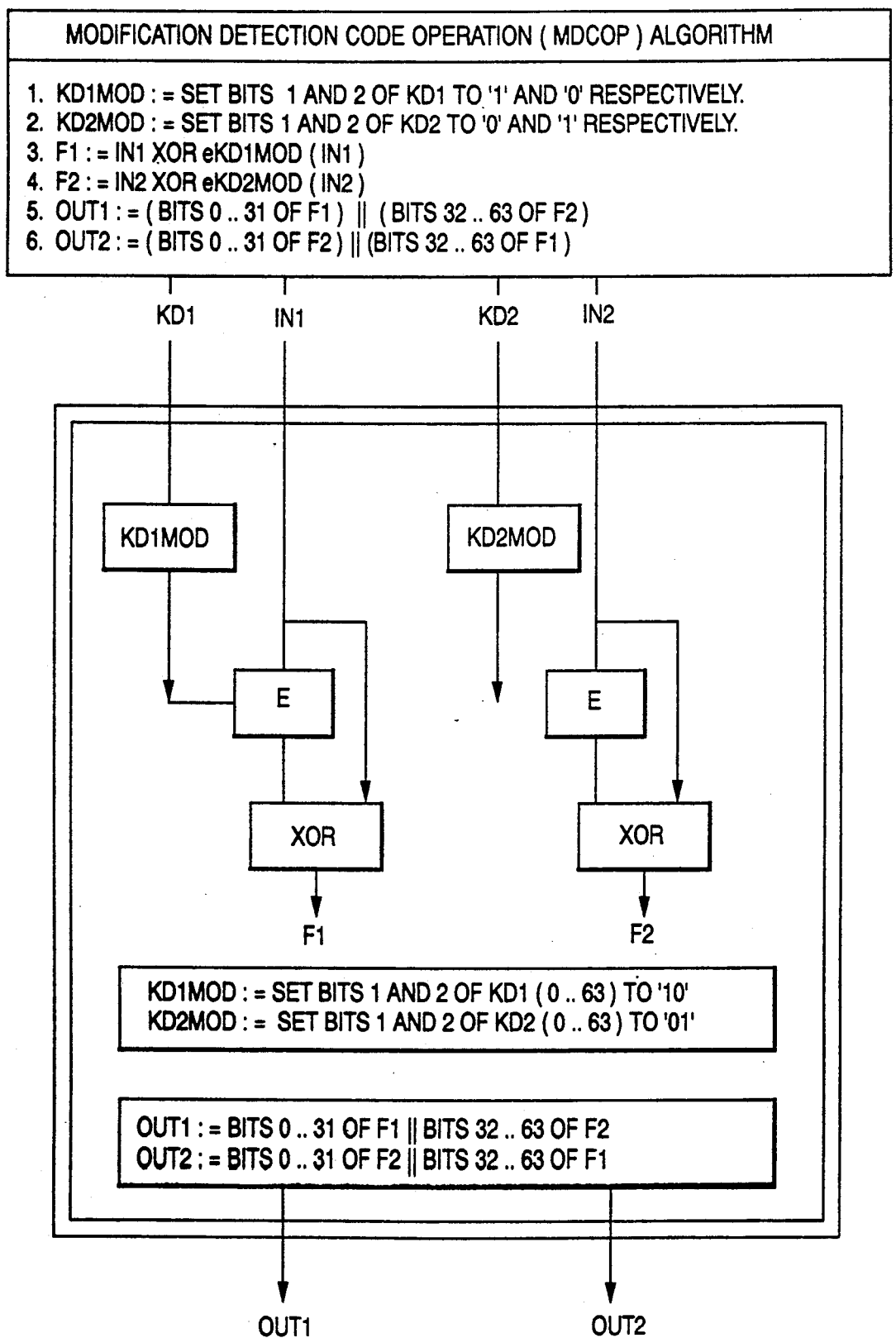
FIG. 11 describes the Modification Detection Code operation (MDCOP), which is employed in the two- and four-encryptions per block MDC algorithms. The figure illustrates the MDCOP algorithm in both text and block diagram forms.
Figure 16:
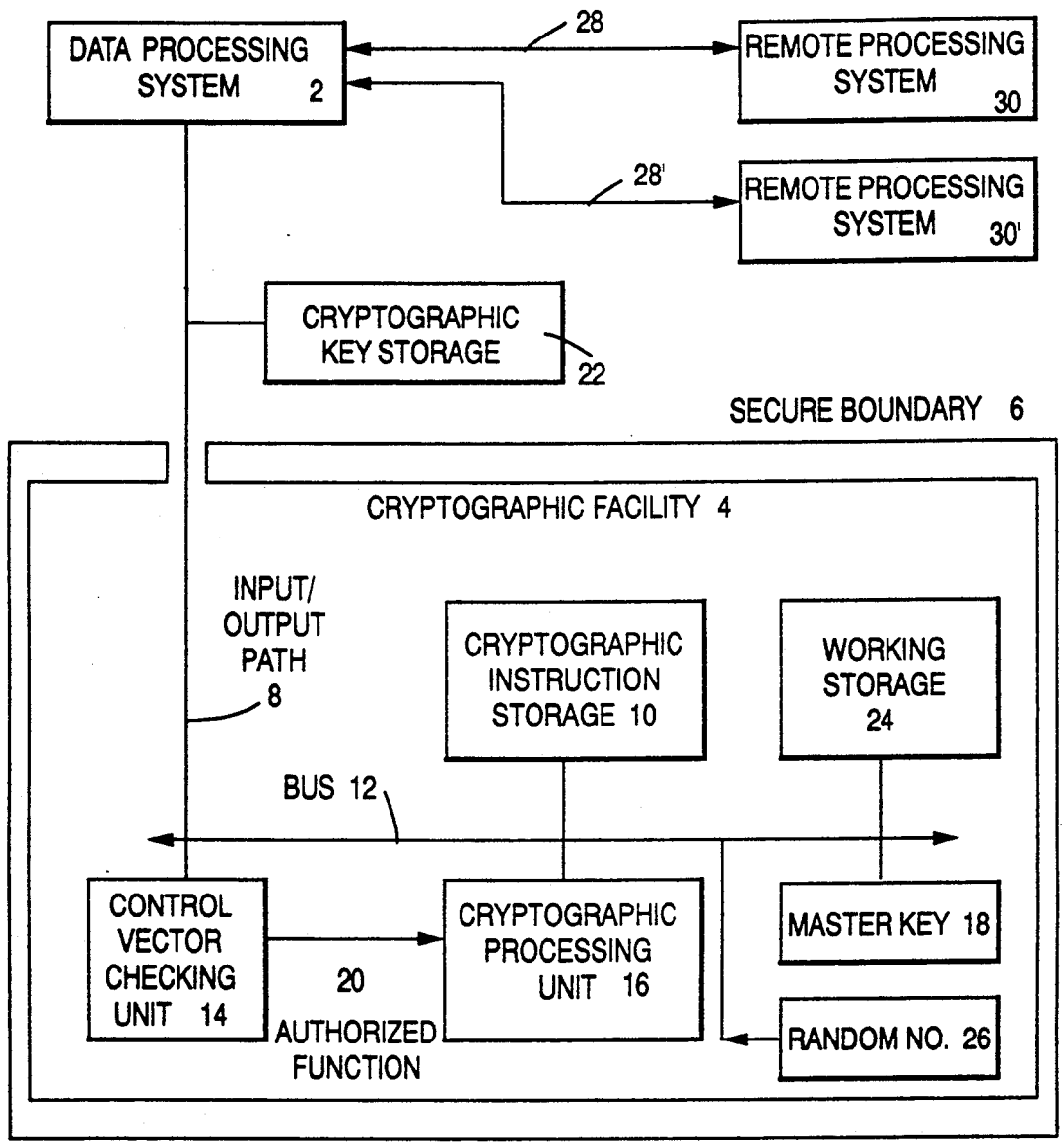
FIG. 16 illustrates a cryptographic facility with a control vector checking unit.

As illustrated in FIG. 16, control vector checking is described in terms of a single control vector checking unit such that control vector checking is performed at a single point within a single cryptographic facility. However, the control vector structure is such that fields and bits in the control vector can be checked separately and independently of one another. Although, some cross checking among two or more control vectors, or among two or more fields in a single control vector, may sometimes be required. This strategy means, for example, that only the appropriate key usage fields in the control vector need to be checked in order for an authorization signal to be generated and sent from the control vector checking unit to the cryptographic processing unit. Moreover, this structuring permits control vector checking to be performed at different times and points within a network of connected cryptographic devices, or to be processed concurrently via multiple parallel processors (e.g., on a connection machine).

Dividing control vector checking among two or more devices gives rise to many different and advantageous architectural and design methodologies for improved key usage control, increased performance, and lower product costs. New and better methods for implementing control vector checking will therefore permit new and better cryptographic hardware and software product designs, where sophisticated and leading-edge methods for controlling key usage are absolutely essential for ensuring security.

Control Vector Checking in a Multiple Parallel Processor Environment

The present invention shows firstly how the task of control checking can be divided among several processors executing in parallel (e.g., a connection machine). For example, if C1, C2 and C3 represent three control vectors, and control vector checking consists of (1) checking C1, (2) checking C2, (3) checking C3, (4) cross checking between C1 and C2 and (5) cross checking between C2 and C3, these five control vector checking steps can be divided among five different processors. A first processor is assigned the task of checking C1, a second processor is assigned the task of checking C2, etc. The tasks performed by the fourth and fifth processors may be more involved, since cross checking between two control vectors is required. Each processor performs its assigned control vector task, which results in either passing or failing the control vector checking process. Each processor reports its finding (i.e., success or failure) back to a designated routine (referred to here as the control vector checking manager). The control vector checking manager counts the votes (i.e., successes and failures). If all five processors report success, then the control vector checking manager sends a control signal to the cryptographic processing unit enabling the execution of the requested cryptographic instruction. (Other voting strategies are also possible.) One of the distinct advantages of the control vector is that it permits multi-path checking. Thus, cryptographic key management applications are geared to take advantage of improved performance achievable with parallel processors and connection machine architectures.

Control Vector Checking Via Multiple Cryptographic Facilities

The present invention shows secondly how the task of control vector checking can be divided among several different cryptographic devices, or their respective cryptographic facilities, which may be located in close proximity or at remote geographical locations at great distances apart, and which may perform control vector checking concurrently (i.e., in parallel), or serially, or at different times in a prearranged order or in no particular order. Using again the example cited above, if C1, C2 and C3 represent three control vectors, and control vector checking consists of (1) checking C1, (2) checking C2, (3) checking C3, (4) cross checking between C1 and C2, and (5) cross checking between C2 and C3, these five control vector checking steps can be divided among five different devices, or equivalently, the cryptographic facilities at each of the respective devices. A first device or cryptographic facility assigned the task of checking C1, a second device or cryptographic facility is assigned the task of checking C2, etc. Each device or cryptographic facility performs its assigned checking task, which results in either passing or failing the control vector checking process. Each device or cryptographic facility reports is finding (i.e., success or failure) back to a designated device or cryptographic facility, e.g., a routine executing in the cryptographic facility, and as cited above referred to as the control vector checking manager. The control vector checking manager counts the votes (i.e., successes and failures). If all five devices or cryptographic facilities report success, then the control vector checking manager sends a control signal to the cryptographic processing unit enabling the execution of the requested cryptographic instruction. We assume that the requested cryptographic instruction has been requested at the device where the control vector checking manager resides. In practice, the control vector checking manager can also assign the control vector checking tasks to each device or cryptographic facility. In other implementations, which device performs which part of the control vector checking may be defined implicitly under the protocol, or it may be known under a protocol via some other context in which the protocol is exercised. (Other voting strategies are also possible.) Dividing the control vector checking among two or more devices may indeed allow product design tradeoffs to be made among product cost, complexity, sophistication in key usage control, performance, and user friendliness. For example, the task of control vector checking need not be provided by a single device, but might be shared with a lower cost device, thus leading to a lower aggregate product cost.

A particular application of this concept is that of control vector checking of a customer defined key usage field via a smart card. Control vector checking of the remainder of the control vector is performed by the cryptographic facility of a co-located cryptographic device such as a terminal or workstation. It is assumed that a user who possesses a smart card interacts with the terminal or workstation in order to perform a desired task, which involves cryptography. Suppose that the cryptographic application requires a 128 bit control vector, where for convenience the first 64 bits are checked at the workstation and the second 64 bits are checked on the smart card. If checking succeeds both at the workstation and the smart card, the requested cryptographic instruction is executed by the cryptographic facility located at the workstation. (Other strategies are possible, e.g., the instruction execution itself can be divided among two or more instruction processors just as the control vector checking is divided, although it is not always possible to process intricate crypto instructions that are normally single threaded using multiple processors.) Dividing the control vector into a first part (a system part checked at a terminal or workstation) and a second part (a user part checked on a smart card) permits cryptographic applications to be tailored to customers. For example, the hardware vendor can tailor the smart cards for customer A by preloading control vector checking microcode unique to customer A on all smart cards sold to customer A, and can tailor the smart cards for customer B by preloading control vector checking microcode unique to customer B on all smart cards sold to customer B. The control vector checking microcode for customer A depends on the control vector field definitions in the user part of the control vector which customer A selects, whereas the control vector checking microcode for customer B depends on the control vector field definitions in the user part of the control vector which customer B selects. In this way, each customer has some common set of control vector checking based on a system defined part of the control vector which is checked at the terminal or workstation, but has a customer unique part which is checked on the smart card. Many other strategies for tailoring the control vector checking via a smart card are also possible, but they all have a common factor that the smart card can be used as an alternative to performing the same checking of a user part of the control vector at the terminal or workstation, since in that case the control vector checking for each different customer must be included in the hardware. The amount of hardware needed to service such a broad base of customer requirements may therefore increase product cost or limit the customers that can be served by such a cryptographic device.

Another possibility for control vector checking in a distributed processing environment is for terminals and workstations to offload the control vector checking to an attached host processor. In a network consisting of a host and a plurality of attached workstations, the control vector checking ordinarily performed at the workstation is instead performed at the host. The possible advantage of such an implementation is that the hardware at the workstation necessary to support cryptography can be minimized, in order to achieve a low product cost. Whereas, at the host, the cost of control vector checking can be borne by a single control vector checking unit. Certain advantageous tradeoffs in hardware design may be achieved in this case. In order for this method of remote control vector checking to be accomplished securely, the terminal must prepare a control vector checking request message consisting of a cryptographic function request and the control vectors for all the keys needed to process the requested function. A message authentication code (MAC) is calculated on the request message using, for example, the ANSI 9.8 method of MAC generation and a prearranged MAC key shared with the host. The MAC is included with the request message sent from the workstation to the host. A response message, consisting of a "yes" if control vector checking at the host succeeds and a "no" if control vector checking at the host fails, is sent from the host to the workstation. A similar MAC is calculated on the response message using a similarly prearranged MAC key shared between the host and workstation, and the MAC is included with the response message set to the workstation. Protocols and procedures for generating and verifying MACs are described in prior art. Copending patent application by Matyas, et al., entitled "Data Cryptography Operations Using Control Vectors," cited above, describes MAC generation and MAC verification instructions which could be used to protect the integrity of the aforementioned control vector checking request and response messages.

Control Vector Checking Via Multiple Logical and Physical Entities

The present invention shows thirdly how the task of control vector checking can be divided among different logical and physical entities, e.g., the crypto facility, CFAP, and application program or user, with different control vector checking objectives. Control vector checking could be structured into three parts: a first part checked by the crypto facility (i.e., in hardware, with highest achievable security), a second part checked by CFAP (i.e., consisting of CFAP assigned control vector fields to be checked), and a third part checked by the application program or user (i.e., consisting of user assigned control vector fields to be checked). In this case, each part checks the appropriate fields in the control vector, and an encrypted key and associated control vector are not used by each party (application program, CFAP, or hardware) unless the control vector checking succeeds. Unlike the example of parallel processors or multiple processors, where each reports success or failure to a control vector checking manager, the process is such that the encrypted key and control vector flow is interrupted or inhibited unless each party is satisfied that the control vector checking succeeds. A variation is to distinguish authorized system personnel from ordinary users or application programs. In this case, control vector checking via authorized system personnel (as opposed to users or application programs) can be performed via a software routine that gains control via a CFAP exit (i.e., that executes in privileged mode as opposed to nonprivileged mode). This permits the vendor and the installation to impose a variety of control vector checking policies that reflect the desires of the customer as well as those of the vendor.

Vote Counting Strategies

In the most general case, a requested cryptographic instruction is executed if all the parts of the control vector which are checked are checked successfully. In other words, a requested cryptographic instruction is executed if each control vector checking unit (or processor which performs the equivalent task of a control vector checking unit) reports "success." Otherwise, if any part of the control vector checking fails, the requested cryptographic instruction is not executed. Other vote counting strategies are possible.

One alternative is that some control vector checking unit responses can take precedent over others. That is, if control vector checking unit i has precedence over control vector checking unit j, and unit i reports "success" and unit j reports "failure," then unit i's vote takes precedence over unit j's vote. In that case, unit i's vote is nullified. As an example, unit i may check the validity of a secret password of an auditor, Which has priority or takes precedence over certain other control vector functions. Unit j might require a decipher attribute D, where if this attribute is not present it reports "failure." But in the example, the auditor function takes precedence, since a secret password is considered to be sufficient to override the lack of a D (decipher) attribute.

Another alternative is to base vote counting on a majority vote, i.e., an instruction is executed if a majority of the control vector checking units report "success." Of course, in order that these different vote counting strategies make sense, the control vector fields must be defined accordingly. However, the scope of the present invention is not limited to only a vote counting strategy whereby all votes must be "success" in order for the instruction to be executed; and one can anticipate that the present invention can be practiced in many different environments all making use of different vote counting strategies.

Voting With Integrity

Each control vector checking unit involved in checking one or more fields of one or more control vectors, all of which are associated with a single cryptographic service request (or cryptographic instruction execution request), casts a yes/no vote based on whether the control vector checking succeeds or fails. When these yes/no votes, or electronic signals, pass from the control vector checking units to a designated managing processor or cryptographic facility over physically protected lines or remain within a physically protected/secure boundary, no additional protective measures are necessary to ensure the integrity of the signals. However, when the yes/no votes or signals pass through an uncontrolled presumably hostile environment, e.g., over exposed communication lines or over an unprotected bus of a cryptographic device, where it may be possible for an adversary to change "no" votes to "yes" votes and thus cause a denied request to be changed to one which is satisfied or fulfilled, the integrity of these signals can be protected via cryptographic means well-known in the prior art. Protocols and procedures for ensuring message integrity using message authentication codes (MACs) are but one well-known means for accomplishing this. The present invention assumes the integrity of the signals produced by the control vector checking units during the period when the yes/no signals pass from the control vector checking units to the managing processor or cryptographic facility where they are interpreted and a decision is made whether to execute the requested cryptographic instruction or not.

More Detailed Description

FIG. 16 describes control vector checking in terms of a single control vector checking unit wherein control vector checking is performed at a single point within a single cryptographic facility. Referring to FIG. 16, let CVa, CVb, ..., CVm denote a set of m control vectors associated with a cryptographic service request received by cryptographic facility 4 over input/output path 8. The usual method of performing control vector checking is for all m control vectors, CVa, CVb, ..., CVm, to be checked by control vector checking unit 14. The decision to process the received cryptographic service request within cryptographic processing unit 16 is likewise based on a single authorized signal issued by control vector checking unit 14 on line 20 to the cryptographic processing unit 16. The control vector checking performed by control vector checking unit 14 on control vectors CVa, CVb, ..., CVm, consists of consistency checking of individual bits and fields within each separate control vector as well as checking of n-tuples of fields within one or more control vectors (referred to as cross checking). This checking may be implicit or implied by control vector type, and may also depend on the nature of the cryptographic service request such as the function requested and parameter values specified within the cryptographic service request.

Figure 17:
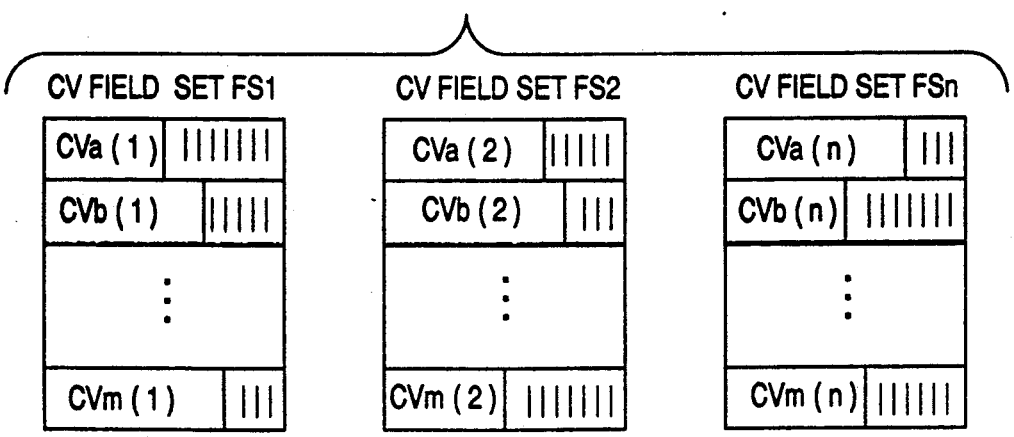
FIG. 17 is a block diagram illustrating n control vector field sets FS1, FS2,...,FSn, each consisting of m subsets of bits and fields selected from m control vectors CVa, CVb, . . . ,CVm, respectively.

A particular characteristic of CV checking is that it is a process which can be divided, ordinarily quite easily, into several smaller discrete processes, for reference purposes called sub-processes, such that the total is the sum of the parts. For example, a first CV checking sub-process may consist of checking a first field in CVa; a second CV checking sub-process may consist of checking a second field in CVa; a third CV checking sub-process may consist of checking a first field in CVb, a fourth sub-process may consist of checking a third field in CVa and a second field in CVb; a fifth sub-process may consist of checking the first field in CVa, the first field in CVb, and a first field in CVc; and so forth. In general, the set of control vectors CVa, CVb, . . . ; CVm can be apportioned into n CV field sets FS1, FS2, . . . ,FSn where each CV field set consists of those bits and fields in CVa, CVb, . . .,CVm that are required for each separate and distinct CV checking sub-process. Referring now to FIG. 17, there is shown n CV field sets FS1, . . .,FSn, where field set FS1 consists of a first set of bits or fields from CVa, denoted CVa(1), a first set of bits or fields from CVb, denoted CVb(1), etc. Field set FS2 consists of a second set of bits or fields from CVa, denoted CVa(2), a second set or bits or fields from CVb, denoted CVb(2), etc. The bits or fields in CVa(1) may be totally different from the bits in CVa(2), . . ., CVa(n), or in some cases there may be some overlap caused by cross checking requirements. The same is true of CVa(2) with respect to CVa(1), CVa(3), . . .,CVa(n), and for CVa(3) with respect to CVa(1), CVa(2), CVa(4), . . .,CVa(n), etc. The same is true for CVb(1), CVb(2), . . .,CVb(n) and for CVc(1), CVc(2), . . .,CVc(n), etc. Moreover, one or more values CVi(j), for arbitrary i and j, can denote empty sets. Thus, is CV checking of FS1 consists only of checking a first field in CVa, denoted CVa(1), then other n-1 subsets CVb(1), . . .,CVm(1) are all empty sets.

Figure 18:
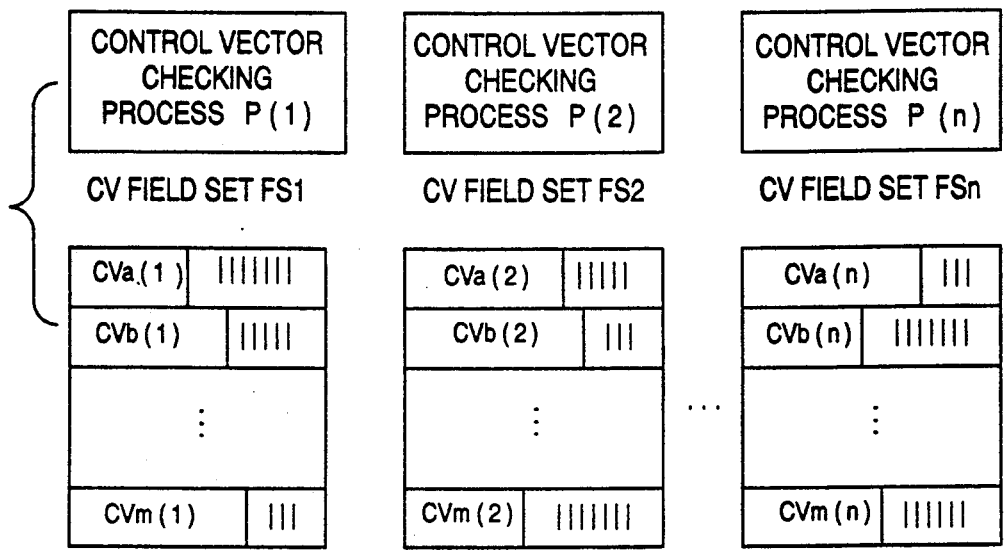
FIG. 18 is a block diagram illustrating n control vector fields sets FS1, FS2, . . . ,FSn and n associated control vector checking processes P(1), P(2),...,P(n).

As illustrated in FIG. 18, each CV field set has an associated control vector checking process (cited above as a sub-process). That is, CV field set FS1 has an associated control vector checking process P(1), CV field set FS2 has an associated control vector checking process P(2), etc. P(1) represents the control vector checking that must be performed on the control vector bits and fields in CVa, CVb,...,CVm, as specified by CVa(1), CVb(1), . . .,CVm(1); P(2) represents the control vector checking that must be performed on the control vector bits and fields in CVa, CVb, . . .,CVm, as specified by CVa(2), CVb(2), . . .,CVm(2), etc. Thus, P(1), P(2), . . .,P(n) are the control vector checking processes associated with CV field sets FS1, FS2,. . .,FSn, respectively.

Since checking of control vectors CVa, CVb, . . .,CVm can be divided into n distinct control vector checking processes P(1), . . .,P(n) operating on n CV field sets FS1, . . .,FSn, respectively, CV checking can therefore be performed at multiple points, by different processors and/or by different programs sharing a common processor. These different processors may be parallel processors attached to a common hardware bus servicing a single cryptographic facility, or they may be distributed processors servicing different cryptographic facilities. Many combinations and embodiments are possible, each having its own unique characteristics attributes, and benefits.

Figure 19:
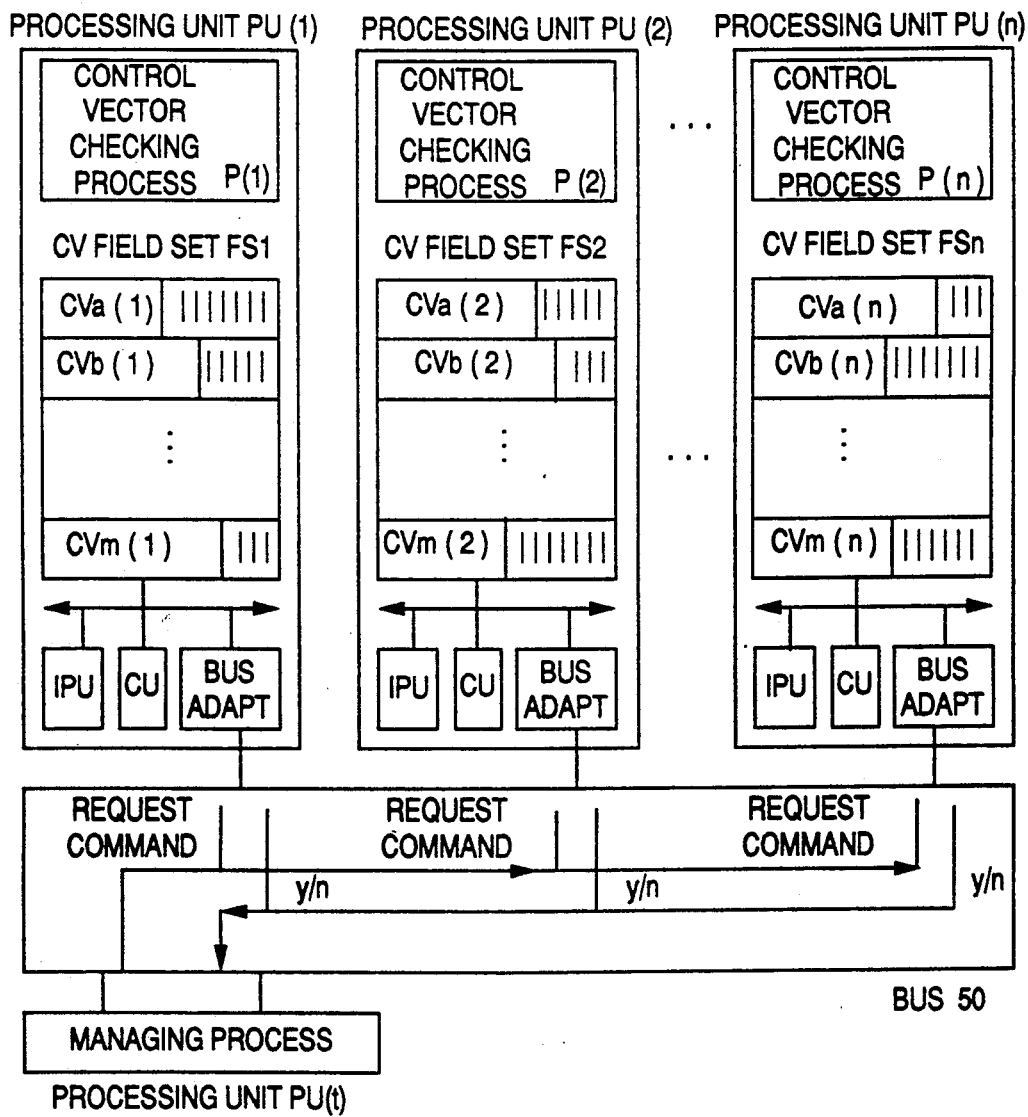
FIG. 19 is a block diagram of a multiprocessor embodiment with a managing process that does not CV checking.

Referring now to FIG. 19, there is shown a first multiprocessor embodiment with a managing process that does not perform CV checking. Each control vector checking process and CV field set pair P(i), FSi is processed via a separate processing unit. Altogether there are n processing units PU(1), . . .,PU(n), such that CV field set FS1 is checked via control vector checking process P(1) executing on processing unit PU(1), CV field set FS2 is checked via control vector checking process P(2) executing on processing unit PU(2), etc. A managing process, responsible for initiating and scheduling the CV checking performed by processing units PU(1), . . .,PU(n) and for collecting the yes/no responses, is performed by a separate processing unit PU(t). Requests for CV checking are made via request commands sent from the managing process to each processing unit. Based on the received yes/no responses, the managing process causes the pending cryptographic service request to be executed or aborted. Each of the processing units PU(1), . . .,PU(n) are connected to the managing process located in processing unit PU(t) via bus 50. The processing units PU(1), . . .,PU(n) and PU(t) may be located within the secure boundary of a single cryptographic facility, thus preserving the integrity of the CV checking process. Each processing unit PU(1) through PU(n) also has an instruction processing unit (IPU), a bus adapter, and an optional crypto-processing unit (CU) for performing encryption/decryption operations (broken lines indicate the CU is optional). Processing unit PU(t) also contains an instruction processing unit, a bus adapter, and a crypto-processing unit. The CU is not optional for processing unit PU(t), since it contains the managing process and therefore performs all cryptographic service requests. An alternative embodiment (not shown) would permit the processing units PU(1), . . .,PU(n), PU(t), and bus 50 to be located within a protected area with integrity, but not necessarily within a single cryptographic facility. Those skilled in the art will appreciate that such an alternative embodiment is easily derived from the embodiment shown in FIG. 19.

Figure 20:
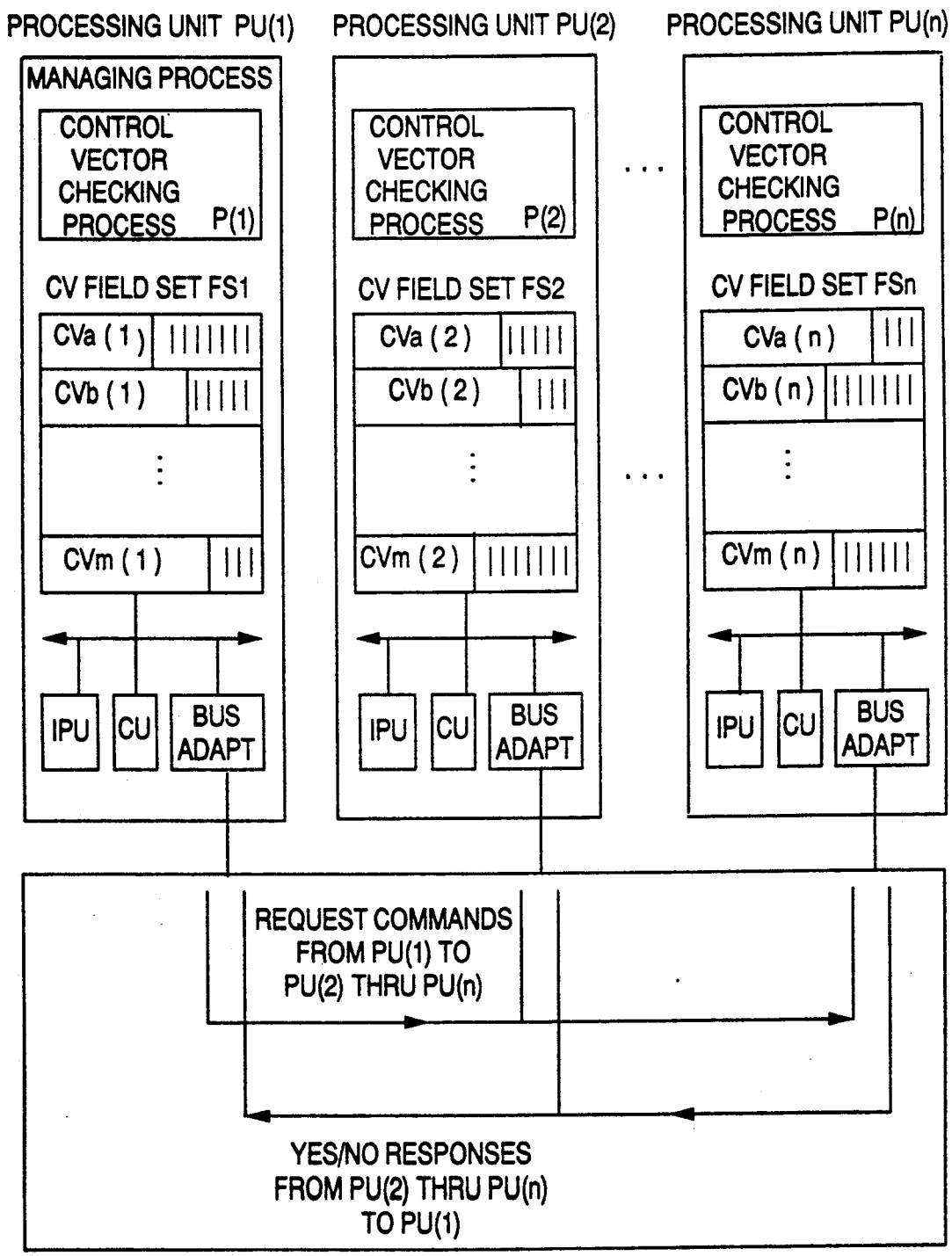
FIG. 20 is a block diagram of a multiprocessor embodiment with a managing process that does CV checking.

Referring now to FIG. 20, there is shown a second multiprocessor embodiment with a managing process that does perform CV checking. Each control vector checking process and CV field set pair P(i), FSi is processed via a separate processing unit. Altogether there are n processing units PU(1), . . .,PU(n), such that CV field set FS1 is checked via control vector checking process P(1) executing on processing unit PU(1), CV field set FS2 is checked via control vector checking process P(2) executing on processing unit PU(2), etc. However, the managing process responsible for initiating and scheduling the CV checking performed by processing units PU(1) through PU(n) and for collecting the yes/no responses is performed by processing units PU(1) through PU(n). In FIG. 20, the managing process executes on processing unit PU(1), but any of the processing units could have been selected. Based on the received yes/no responses, the managing process causes the pending cryptographic service request to be executed or aborted. Each of the processing units PU(1), . . .,PU(n) are connected via bus 50. The processing units PU(1), . . .,PU(n) may be located within the secure boundary of a single cryptographic facility, thus preserving the integrity of the CV checking process. Each processing unit PU(2) through PU(n) also has an instruction processing unit (IPU), a bus adapter, and an optional crypto-processing unit (CU) for performing encryption/decryption operations (broken lines indicate the CU is optional). Processing unit PU(1) also contains an Instruction Processing Unit, a Bus Adapter, and a Crypto-Processing Unit. The CU is not optional for processing unit PU(t), since it contains the managing process and therefore must perform all cryptographic service requests. An alternative embodiment (not shown) would permit the processing units PU(1), . . .,PU(n) and bus 50 to be located within a protected area with integrity, but not necessarily within a single cryptographic facility. Those skilled in the art will appreciate that such an alternative embodiment is easily derived from the embodiment shown in FIG. 20.

Figure 21:
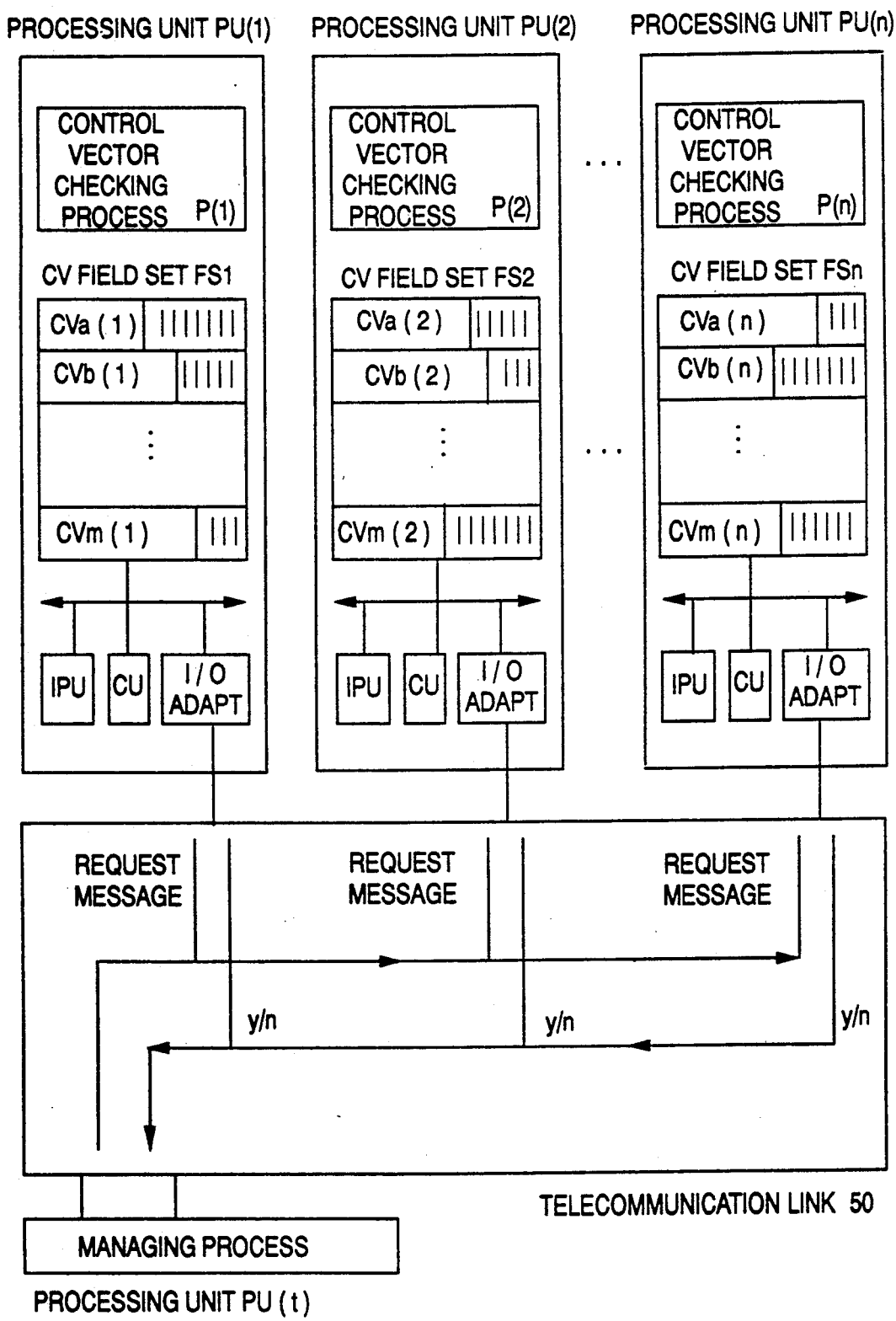
FIG. 21 is a block diagram of a distributed processor embodiment with a managing process that does no CV checking.

Referring now to FIG. 21, there is shown a first distributed processor embodiment with a managing process that does not perform CV checking. Each control vector checking process and CV field set pair P(i), FSi is processed via a separate processing unit. Altogether there are n processing units PU(1), . . .,PU(n), such that CV field set FS1 is checked via control vector checking process P(1) executing on processing unit PU(1), CV field set FS2 is checked via control vector checking process P(2) executing on processing unit PU(2), etc. A managing process, responsible for initiating and scheduling CV checking performed by processing units PU(1), . . .,PU(n) and for collecting the yes/no responses, is performed by a separate processing unit PU(t). Requests for CV checking are made via request messages sent from the managing process to each processing unit. Based on the received yes/no responses, the managing process causes the pending cryptographic service request to be executed or aborted. Each of the processing units PU(1), . . .,PU(n) communicate with the managing process located in processing unit PU(t) via telecommunications link 50. The processing units PU(1), . . .,PU(n) and PU(t) are each located within the secure boundary of separate cryptographic facilities, thus preserving the integrity of the CV checking process. That is, PU(1) is located in a first CF, PU(2) is located in a second CF, etc. Each processing unit PU(1) through PU(n) also has an instruction processing unit (IPU), an I/O adapter, and an optional crypto-processing unit (CU) for performing encryption/decryption operations (broken lines indicate the CU is optional). Processing unit PU(t) also contains an instruction processing unit, an I/O adapter and a crypto-processing unit. The CU is not optional for processing unit PU(t), since it contains the managing process and therefore performs all cryptographic service requests. An alternative embodiment (not shown) would permit the processing units PU(1), . . .,PU(n) and PU(t) each to be located within protected areas with integrity, but not necessarily within respective cryptographic facilities. Those skill in the art will recognized that such an alternative embodiment is easily derived from the embodiment shown in FIG. 21.

Figure 22:
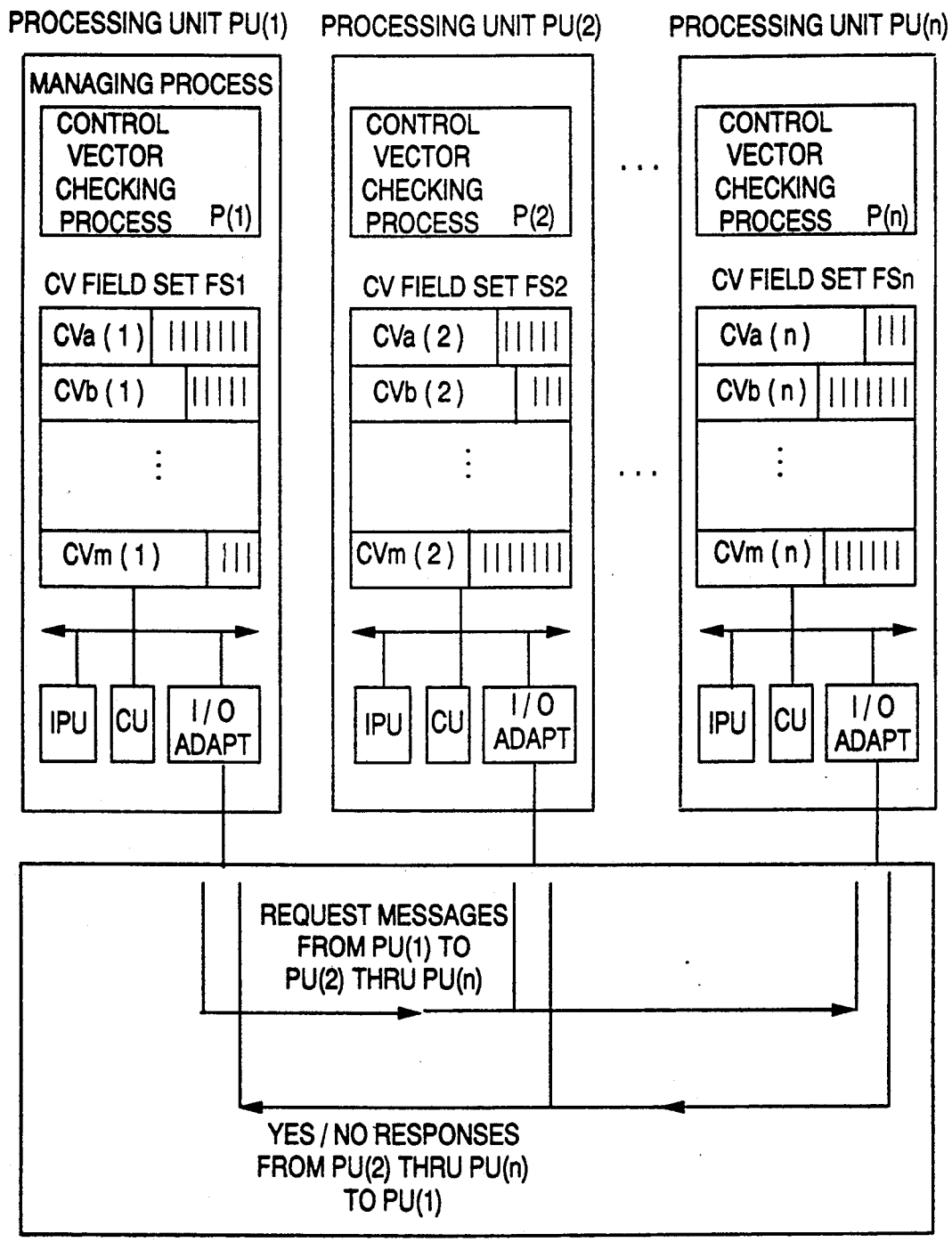
FIG. 22 is a block diagram of a distributed processor embodiment with a managing process that does CV checking.
Figure 23:
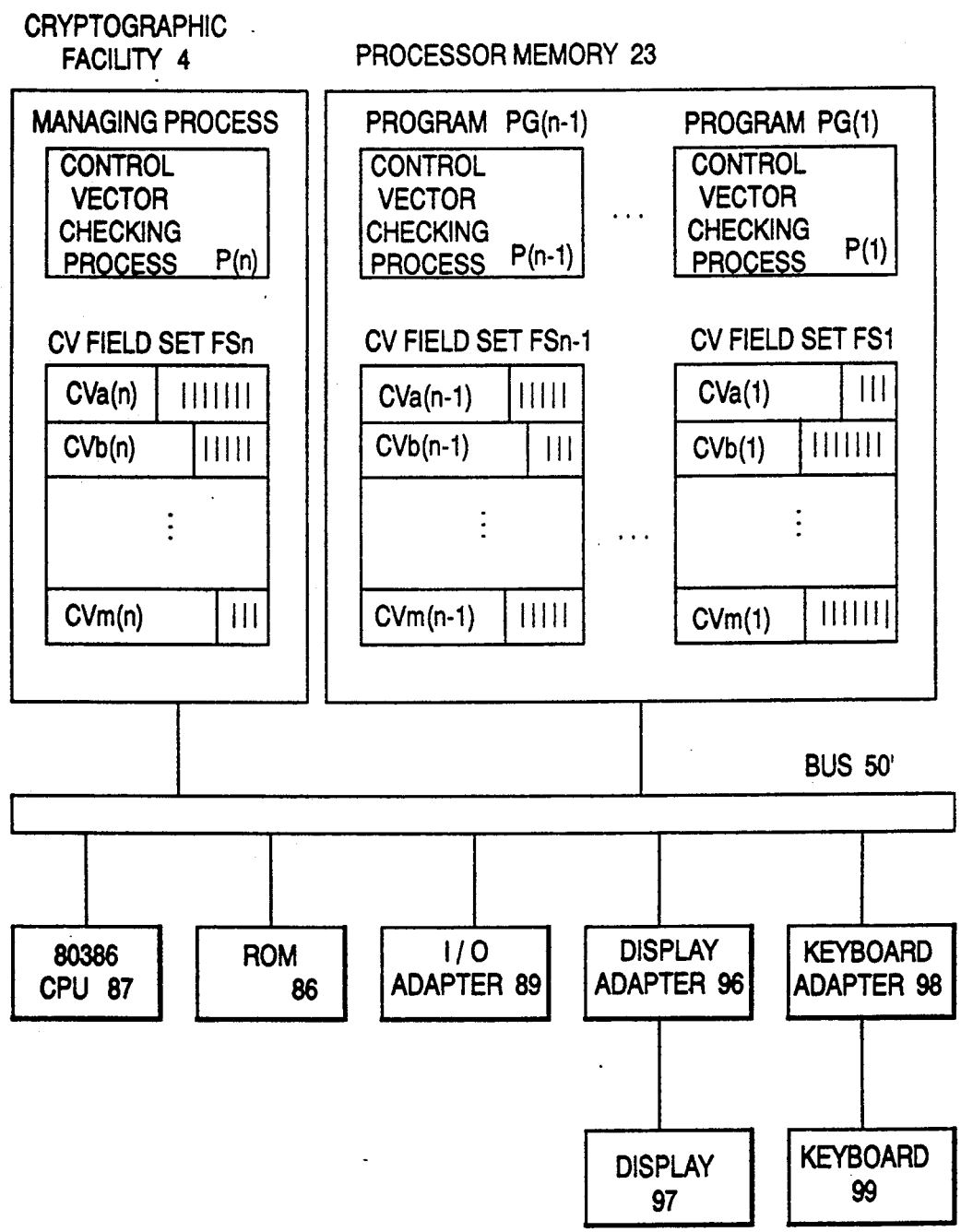
FIG. 23 illustrates the managing processor function in a multiprocessor environment.
Figure 24:
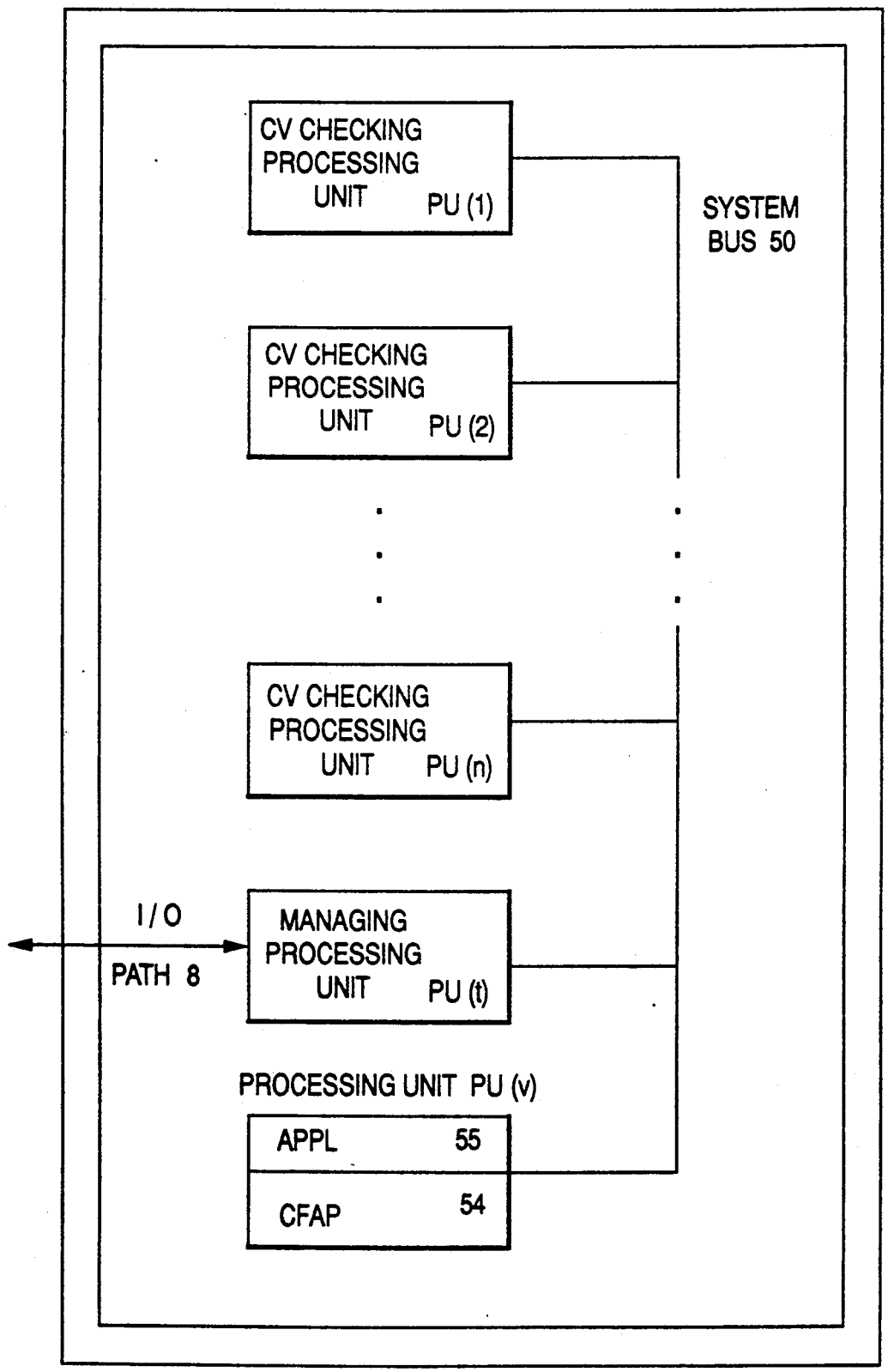
FIG. 24 is a detailed diagram illustrating the control vector checking process in a multiprocessor environment.
Figure 25:
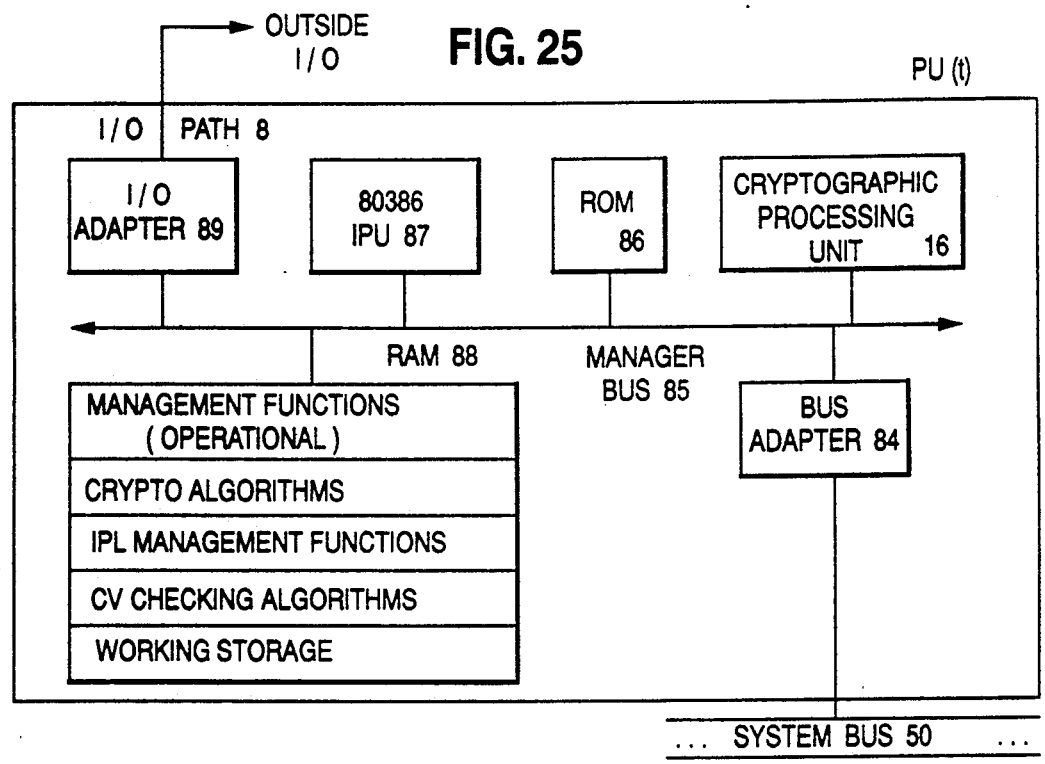
FIG. 25 is a flow diagram illustrating the control vector management process in a multiprocessor environment.
Figure 26:
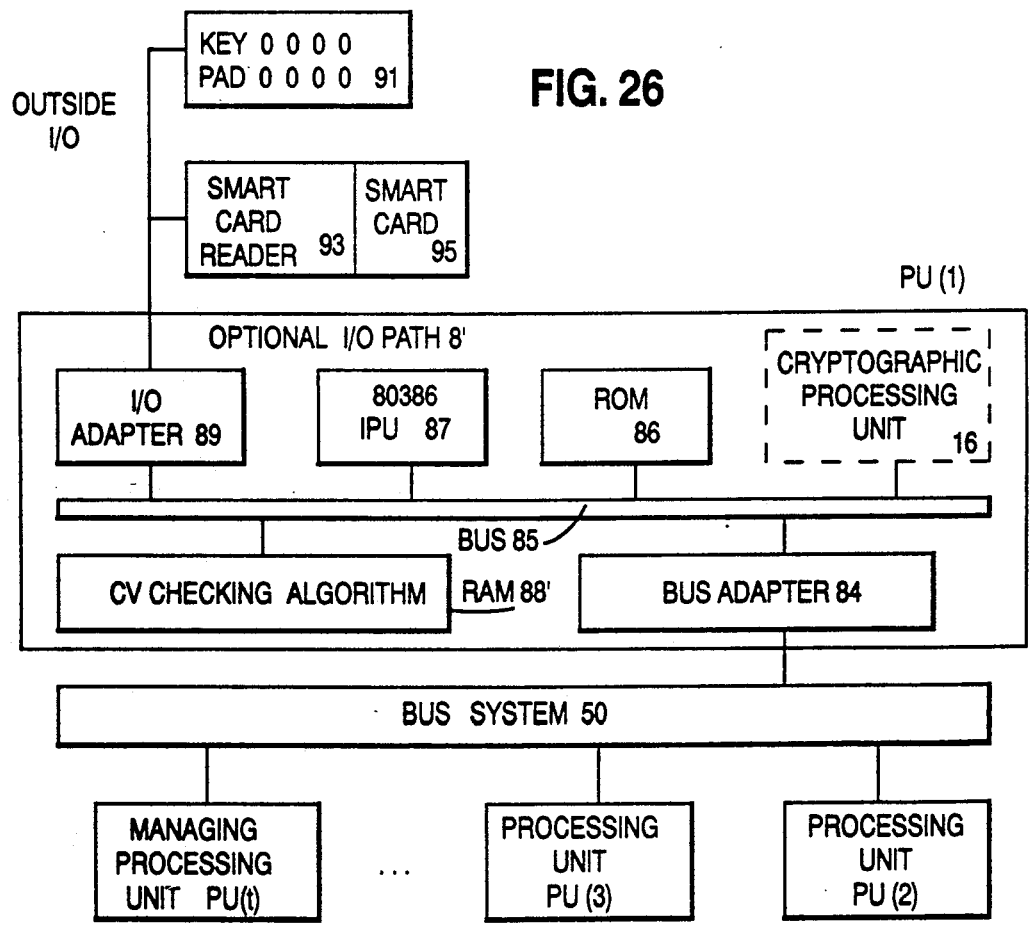
FIG. 26 is a functional block diagram of a processing unit PU(1).
Figure 27:
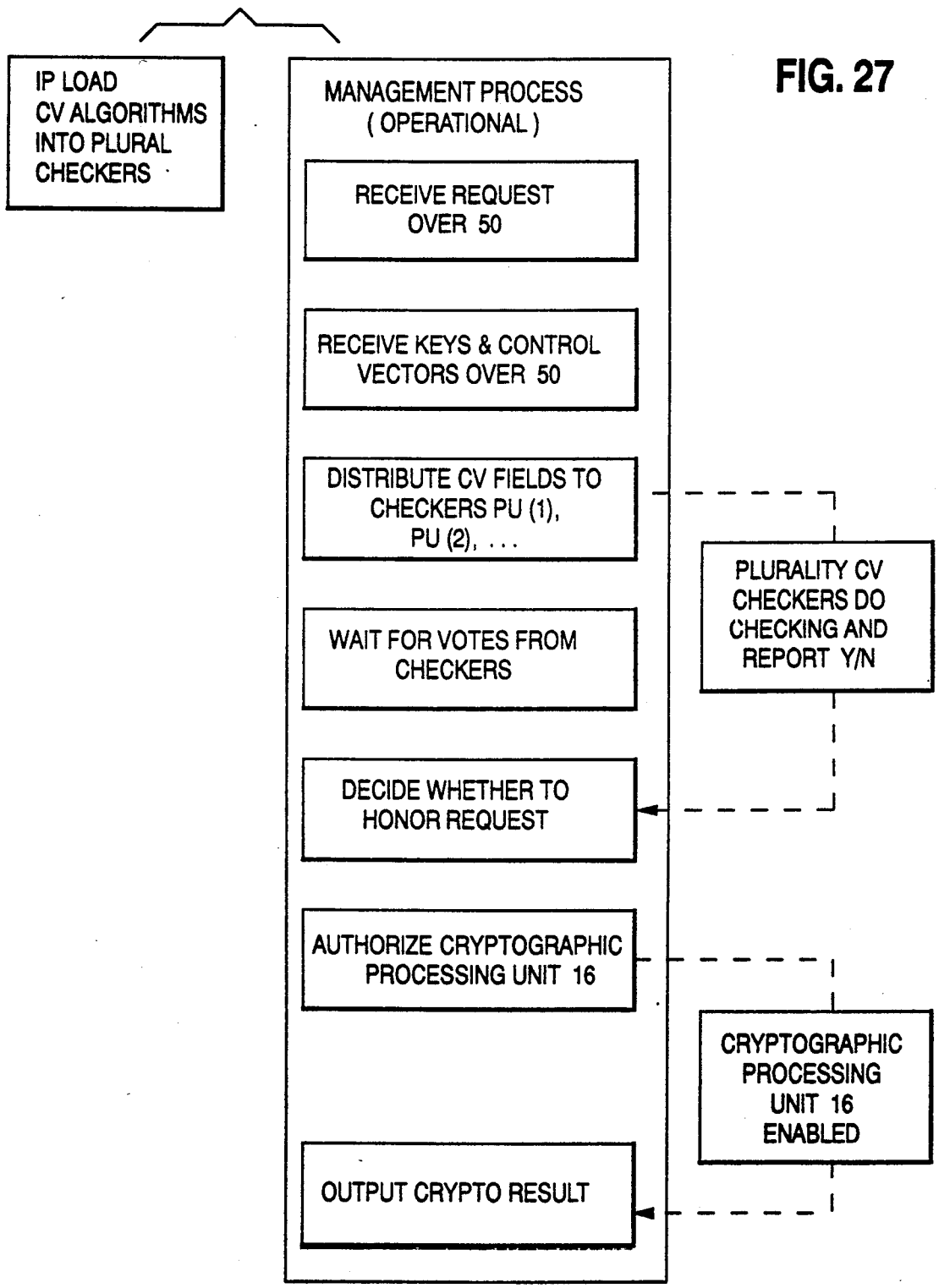
FIG. 27 is a flow diagram of the control vector management process in PU(t).

Referring now to FIG. 22, there is shown a second distributed processor embodiment with a managing process that does perform CV checking. Each control vector checking process and CV field set pair P(i), FSi is processed via a separate processing unit. Altogether there are n processing units PU(1), . . .,PU(n), such that CV field set FS1 is checked via control vector checking process P(1) executing on processing unit PU(1), CV field set FS2 is checked via control vector checking process P(2) executing on processing unit PU(2), etc. However, the managing process responsible for initiating and scheduling the CV checking performed by processing units PU(1) through PU(n) and for collecting the yes/no responses is performed by one of the n processing units PU(1) through PU(n). In FIG. 22, the managing process executes on processing unit PU(1), but any of the processing units could have been selected. Based on the received yes/no responses, the managing process causes the pending cryptographic service request to be executed or aborted. Each of the processing units PU(1), . . .,PU(n) communicate via communications link 50. The processing units PU(1), . . .,PU(n) are each located within the secure boundary of separate cryptographic facilities, thus preserving the integrity of the CV checking process. That is, PU(1) is located in a first CF, PU(2) is located in a second CF, etc. Each processing unit PU(2) through PU(n) also has an instruction processing unit (IPU), an I/O adapter, and an optional crypto-processing unit (CU) for performing encryption/decryption operations (broken lines indicate the CU is operational). Processing unit PU(1) also contains an instruction processing unit, an I/O adapter, and a crypto-processing unit. The CU is not optional for processing unit PU(t), since it contains the managing process and therefore must perform all cryptographic service requests. An alternative embodiment (not shown) would permit the processing units PU(1), . . .,PU(n) each to be located within protected areas with integrity, but not necessarily within respective cryptographic facilities. Those skilled in the art will recognize that such an alternative embodiment is easily derived from the embodiment shown in FIG. 22. FIG. 23 depicts another embodiment of CV checking performed by a terminal or workstation, such as an IBM Personal Computer. Attached to bus 50' are a cryptographic facility 4 containing a managing process, a control vector checking process P(n), and a CV field set FSn; a processor memory 23 containing field sets FS1 through FSn-1, control vector checking processes P(1) through P(n-1), and programs PG(1) through PG(n-1); an 80386 CPU 87, a ROM 86, an I/O adapter 89, a display adapter 96 with attached display 97, and a keyboard adapter 98 with attached keyboard 99. Reference is made to U.S. Pat. No. 4,768,149 to B. J. Konopik, et al. entitled "System for Managing a Plurality of Shared Interrupt Handlers in a Linked List Data Structure," incorporated herein by reference, for a description of the operation of an IBM Personal Computer. The embodiment in FIG. 23 is characterized by a serial CV checking process in lieu of a parallel or distributed CV checking process. Processor memory 23 contains n-1 levels of software, some of which may operate at different levels of memory protection, isolation, and integrity, privileged and nonprivileged states, application versus system level programs, etc. These levels of software form a hierarchy of control, such that CV field set FS1 is checked via control vector checking process P(1) as part of program PG(1) running in software level 1. If the CV checking succeeds, control passes to the next software level where CV field set FS2 is checked via control vector checking process P(2) as part of program PG(2) running in software level 2. If the CV checking succeeds, control passes to the next software level, etc. If CV checking at software level n-1 succeeds, a cryptographic service request is issued to cryptographic facility 4 where CV field set FSn is checked via control vector checking process P(n). If CV checking within CF4 succeeds, the pending cryptographic service request is executed by CF4. If, on the other hand, CV checking fails at any level, e.g. at any one of the CV checking processes P(1) through P(n-1) contained in programs PU(1) through PG(n-1), respectively, or in CV checking process P(n) within CF4, then the cryptographic service request is aborted. The managing process in CF4 is responsible for scheduling control vector checking only of CV field set FSn by control vector checking process P(n), which is executed by CF4. The managing process has no responsibility for scheduling CV checking for CV field sets FS1 through FSn-2 by CV checking processes P(1) through P(n-1) contained in programs PG(1) through PG(n-1), respectively, or to receive yes/no responses resulting therefrom. Instead, the CV checking is serialized such that control passes from one program to another, say from PG(i) to PG(i+1), and from program PG(n-1) to CF4, only if CV checking succeeds. Otherwise, the cryptographic service request is aborted. In this sense, the act of "passing control" from one processing entity to another (program to program, or program to CF) is the logical equivalent of a "yes" response. Those skilled in the art will recognize that other similar embodiments are possible, which combine features and concepts of multiprocessing and multiprogramming. For example, CV field sets FS1 through FSi can be checked via control vector checking processes P(1) through P(i) as part of programs PG(1) through PG(i) running in processor memory 23 attached to bus 50' of a first network device/node; CV field sets FSi+1 through FSj can be checked via control vector checking processes P(i+1) through P(j) executing on processing units PU(i+1) through P(j), where each processing unit is contained in a separate cryptographic facility associated with second, third, etc., network devices and linked together via a common network communications link 50; and where CV field sets FSj+1 through FSn can be checked via control vector checking processes P(j+1) through P(n) executing on processing units PU(j+1) through PU(n) contained in cryptographic facility 4 attached to bus 50' of said first network device. FIG. 24 provides a system overview of the CV checking embodiment depicted in FIG. 19. Referring now to FIG. 24, there is shown CV checking processing units PU(1), . . .,PU(n), a managing processing unit PU(t), and a processing unit PU(v) connected to a common system bus 50, all of which are located within a secure boundary 6. Processing unit PU(v) contains application programs denoted APPL 55, and a cryptographic facility access program (CFAP) 54. Cryptographic service requests are initiated via an application program APPL 55 to CFAP 54. In turn, CFAP 54 issues cryptographic service requests (or cryptographic instructions) to the managing processing unit PU(t) via system bus 50. Secure boundary 6 may be the secure boundary of cryptographic facility 4 or it may be a wider or broader boundary such that cryptographic facility 4 is located within managing processing unit PU(t). Cryptographically speaking, secure boundary 6 is such that it protects the integrity and secrecy of the internal components, as depicted in FIG. 24, from physical penetration or probing attacks. Logical isolation and protection of processing units PU(1), . . .,PU(n), PU(t) and PU(v) is also provide via internal command protocols implemented among the processing units connected via system bus 50. Further isolation and protection can be achieved by implementing multiple buses, such that system bus 50 is attached only to processing units PU(1), . . .,PU(n) and PU(t), but no others, and PU(t) is connected to other processing units such as PU(v) via a different system bus. FIG. 25 gives a block diagram representation of managing processing unit (PU(t). An input/output path 8 connected to I/O adapter 89 provides the managing processing unit with an external communication capability with attached devices, for receiving inputs and sending outputs. Bus adapter 84 attached to system bus 50 provides a path for receiving cryptographic service requests, cryptographic keys and their associated control vectors from CFAP 54 located in processing unit PU(v). Alternatively, CFAP 54 can be located in any processing unit attached to system bus 50, including processing units PU(1) through PU(n) and PU(t), as long as the integrity of the CV checking process is not violated, or CFAP 54 can be located in a processing unit attached to another system bus connected to processing unit PU(t). In some embodiments, cryptographic service requests, cryptographic keys and their associated control vectors can be received over input/output path 8, for example in the processing unit P(1) of FIG. 26. Bus adapter 84 connected to system bus 50 also provides a path for sending requests (commands, messages, etc.) to processing units PU(1) through PU(n) in order to schedule CV checking in those processing units, i.e., for initializing CV checking processes P(1) through P(n) and CV field sets FS1 through FSn within processing units PU(1) through PU(n), respectively, and causing CV checking to take place. Bus adapter 84 connected to system bus 50 also provides a path for receiving yes/no responses (or votes) from processing units PU(1) through PU(n) in order to allow the outcomes of CV checking to be reported. An 80386 instruction processing unit (IPU) 87 executes microcode stored in ROM 86 and program code stored in RAM 88. A cryptographic processing unit 16 executes cryptographic functions in response to an authorize signal sent via manager bus 85. RAM 88 contains management functions, including IPL management functions for preloading processing units PU(1) through PU(n) with CV checking processes P(1) through P(n), respectively; a scheduling algorithm for loading CV field sets FS1 through FSn in processing units PU(1) through PU(n), respectively, in order to schedule and initiate CV checking, and a decision algorithm for receiving and analyzing the yes/no responses and for sending an authorize signal to cryptographic processing unit 16 to cause a requested cryptographic function to be executed. Alternatively, CV checking processes P(1) through P(n) can be transmitted to processing units PU(1) through PU(n), respectively, at the same time the field sets FS1 through FSn are transmitted to processing units PU(1) through PU(n), respectively. RAM 88 also contains cryptographic algorithms for execution by cryptographic processing unit 16, and a work storage for storing data and key variables. Programs, data, and keys stored in working storage are received via bus adapter 84 over system bus 50 or via I/0 adapter 89 over I/O path 8. FIG. 27 gives a flow diagram of the control vector management process in PU(t). A cryptographic service request, cryptographic keys and their associated control vectors are received via bus adapter 84 over system bus 50 from CFAP 54 located in processing unit PU(v). The received control vectors, denoted CV1, . . .,CVm, are parsed into CV field sets FS1, . . .,FSn, and these CV fields are distributed over system bus 50 to CV checking processes P(1), . . .,P(n) located in processing units PU(1), . . .,PU(n), respectively. Alternatively, P(1), . . .,P(n) are distributed dynamically with FS1, . . .,FSn, i.e., P(1) and FS1 are distributed to PU(1), P(2) and FS2 are distributed to PU(2), etc. The managing processing unit PU(t) then waits for the yes/no responses (i.e., votes) to be received from all processing units. Upon receipt of all responses, the managing process counts the votes and decides whether to continue or abort. A typical decision procedure merely requires all responses to be "yes," in which case an authorize signal is sent to cryptographic processing unit 16 causing the requested cryptographic function to be executed. If one or more "no" responses are received, the cryptographic service request is aborted. More complex and different decision procedures are possible, as have been cited in more detail under the summary of the invention. The cryptographic processing unit 16 decrypts, processes, and encrypts keys and data according to the function that has been requested. The function outputs are returned to CFAP 54 via system bus 50. FIG. 26 gives a block diagram representation of processing unit PU(1), which is one of the n processing units performing CV checking. PU(1) contains an I/O adapter 89, an 80386 instruction processing unit (IPU) 87, a ROM 86, a cryptographic processing unit 16, a RAM 88', and a bus adapter 84, all of which are connected to internal bus 85. Outside I/O from attached devices such as smart card 95 which can be read from an attached smart card reader 93 or by a key pad 91 provides for external communications over I/O path 8' Bus adapter 84 attached to system bus 50 provides a path for receiving CV checking algorithms (i.e., CV checking process P(1) and CV field sets (i.e., CV field set FS1)) from managing processing unit PU(t), and for sending yes/no responses back to managing processing unit PU(t). The data communicated via system bus 50 is assumed to have integrity, since system bus 50 is contained within secure boundary 6. An 80386 IPU 87 provides a capability to execute microcode stored in ROM 86 and to execute CV checking algorithms (i.e., CV checking process P(1) stored in RAM 88'). An optional cryptographic processing unit 16 is provided in the event that processing unit PU(1) may sometime act as the managing processing unit, or in the event that PU(1) executes cryptographic functions on behalf of some other request not connected with the CV checking function. Referring now to FIG. 26, the control vector checking process consists of the following steps. A request (command, message, etc.) containing CV checking process PU(1) is received via bus adapter 84 over system bus 50 from managing processing unit PU(t). In response, processing unit PU(1) causes CV checking process P(1) to be stored in RAM 88'. (In lieu of this, CV checking process P(1) can be sent together with CV field set FS1.) Later, a similar request containing CV field set FS1 is received via bus adapter 84 over system bus 50 from managing processing unit PU(t). In response, processing unit PU(1) performs CV checking on CV field set FS1 using CV checking process P(1) stored in RAM 88'. If CV checking succeeds, a yes response is sent to managing processing unit PU(t) via system bus 50; if CV checking fails a no response is sent to PU(t) via system bus 50.

The advantage in performing CV checking via multiple processors in a parallel processing environment is mainly that of improved performance. Conversely, in a world full of parallel processing machines, it is advantageous to be able to perform parallel computations instead of serial computations. However, improved security can be achieved as well by adapting the above embodiments to perform CV checking of field sets FS1, . . .,FSn by CV checking process P(1), . . .,P(n) using 2n processing units instead of n processing units. In this case, each CV field set FSi is checked by CV checking process P(i) twice, using two different processing units. Thus, if the security of one processor is subverted by causing a yes response to be sent to managing processing unit PU(t) instead of a current no response to the overall security of the CV checking process is not subverted. In this case, another processing unit will report no, in which case the cryptographic service request is aborted. Another benefit of parallel CV checking is to improve reliability. In this case, we constantly have a cross checking capability, i.e., the output of one processing unit can be cross checked against that of another, so that accidental hardware and software failures are more easily detected, and accidental execution of cryptographic functions is much less likely to occur. Those skilled in the art will recognize that these and other similar variations on the basic embodiments are possible, and that different types of CV checking scheduler algorithms providing for improved security and reliability can be advantageously implemented in such a multiprocessor environment.

Figure 28:
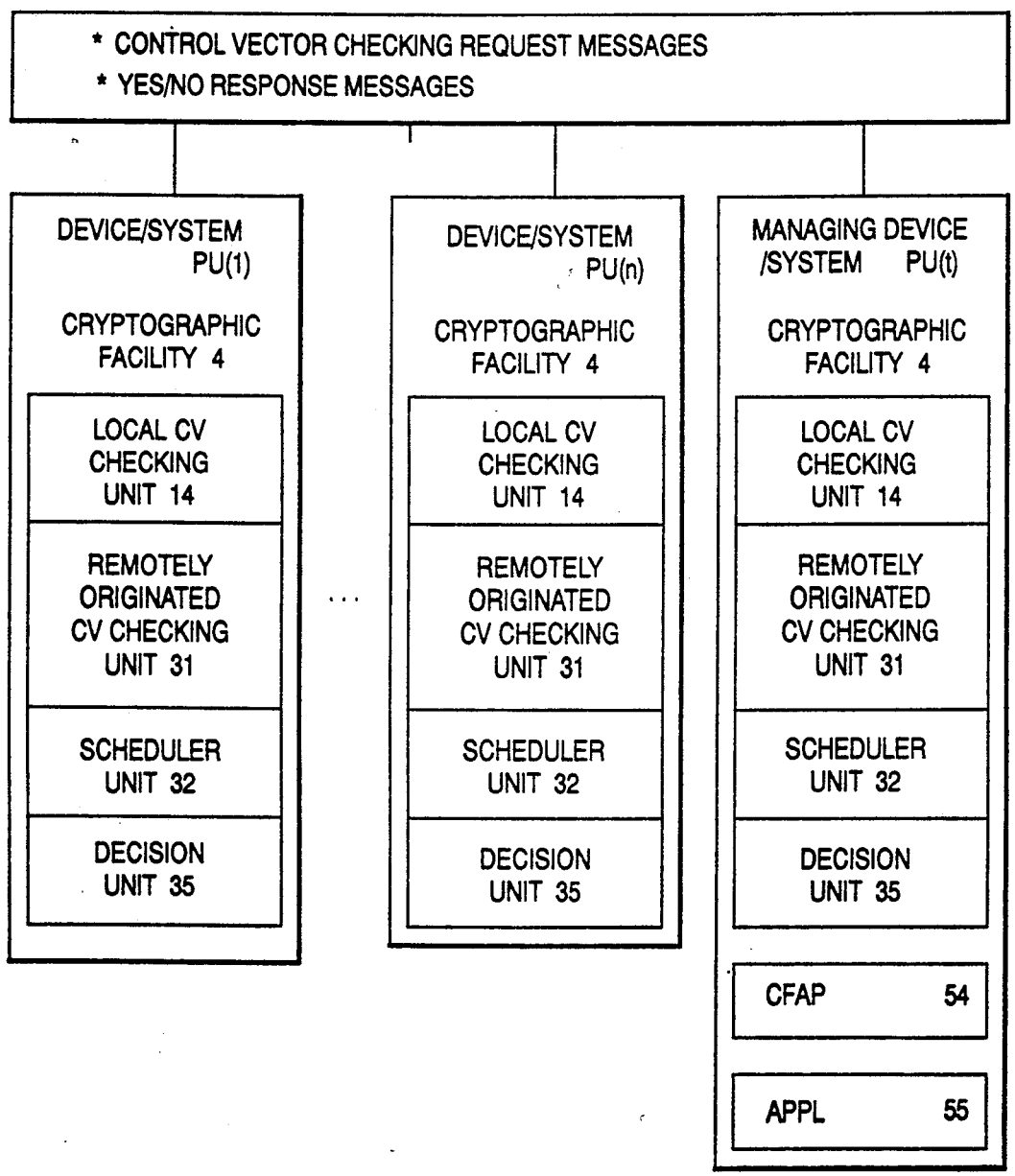
FIG. 28 is a block diagram of a network of connected cryptographic devices with a distributed control vector checking capability.

In addition to performing CV checking via parallel processors, CV checking can be performed advantageously in a distributed processor environment. FIG. 28 is a block diagram representation of a network of connected cryptographic devices with a distributed control vector checking capability. The network comprises devices/systems PU(1), . . .,PU(n) and PU(t) connected via communications link 50. Each of the devices/systems contains a cryptographic facility 4 capable of receiving cryptographic service requests. Thus, any device can be a managing device and perform the task of scheduling CV checking to be performed at any other device in the network. However, for sake of simplicity, device/system PU(t) is assumed to be the managing device/system responsible for scheduling CV checking at devices PU(1) through PU(n), whereas devices/system PU(1) through PU(n) perform CV checking only. Device/system PU(t) also has application programs (APPL) 55 and a cryptographic facility access program (CFAP) 54, and these are depicted since device/system PU(t) is the managing device. In fact, devices/systems PU(1) through PU(n) have application programs and a CFAP, but are not shown in FIG. 28. Typically, a request for cryptographic service is initiated by an APPL 55 to CFAP 54. In turn, CFAP 54 issues a cryptographic service request to cryptographic facility 4. In response, device/system PU(t) schedules CV checking at devices/systems PU(1) through PU(n) via scheduler unit 32. A local CV checking unit 14 is also provided in device/system PU(t) to allow for the possibility that the managing device may also desire or require local CV checking, e.g., where device/system PU(t) may perform local CV checking in lieu of remote CV checking, or where device/system PU(t) may wish to perform part of the necessary CV checking locally and part of the CV checking remotely. CV checking at devices PU(1) through PU(n) is performed by remotely-originated CV checking units 31, respectively. As a result, each of the devices/systems PU(1) through PU(n) responds by sending a "yes" response to device/system PU(t) if CV checking succeeds or a "no" response if CV checking fails. A decision unit 35 at device/system PU(t) processes the responses received from systems/devices PU(t) through PU(n). Based on a decision algorithm contained in decision unit 35, decision unit 35 either issues an authorize signal thus authorizing the execution of the requested cryptographic function or an abort signal thus denying the execution of the requested cryptographic function. The outputs of the executed cryptographic function are directed from the cryptographic facility 4 to CFAP 54, and thence from CFAP 54 to APPL 55. This completes the sequence. A more detailed explanation is now provided.

Figure 29:
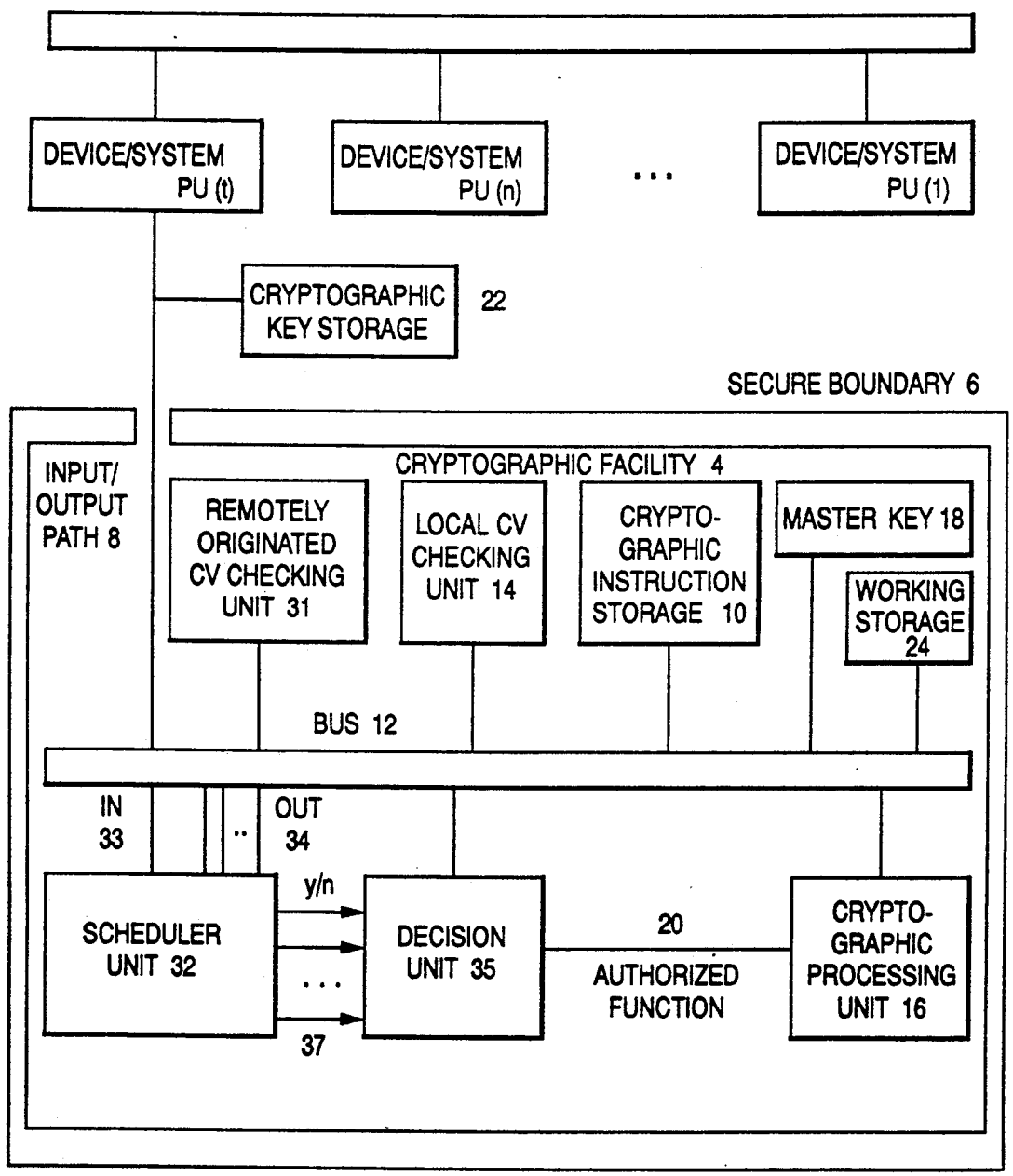
FIG. 29 is a block diagram representation of a cryptographic facility with distributed control vector checking capability.

FIG. 29 gives a block diagram representation of a network of connected cryptographic devices/systems. Device/system PU(t) executes a program such as the crypto facility access program 54 and the application programs 55, as illustrated in FIG. 28. These programs output cryptographic service requests for the management of cryptographic keys and for the cryptographic processing of data and other cryptographic quantities which are associated with control vectors. Control vectors define the functions which the associated keys are allowed by their originator(s) to perform. A cryptographic facility validates that key management and cryptographic processing functions requested for a cryptographic key, or set of keys, by the program have been authorized by the originator of the key or keys. Device/system PU(t) is connected to other devices/system, including devices/system PU(1) through PU(n) via communications link 50. Each such device/system, although not shown, has a configuration similar to that of device/system PU(t).

Referring now to FIG. 29, device/system PU(t) possesses a cryptographic facility (CF) 4 which is characterized by a secure boundary 6. An input/output path 8 passes through the secure boundary 6 for receiving the cryptographic service request, cryptographic keys and their associated control vectors from the program. Also the cryptographic facility outputs responses to cryptographic service requests over input/output path 8.

Included within the secure boundary 6 is a cryptographic instruction storage 10 which is coupled by units of the bus 12 to the input/output path 8. A local CV checking unit 14, a scheduler unit 32, a decision unit 35, and a cryptographic processing unit 16 are coupled to the instructions in storage 10. A master key storage 18 is coupled to the cryptographic processing unit 16. A working storage 24 is also coupled to the cryptographic processing unit 16, for storage of intermediate results of computations and for storing data and keys and other quantities which are input to CF4 over input/output path 8. Also included within the secure boundary 6 is a remotely-originated CV checking unit 31 which is coupled by units of the bus 12 to the input/output path 8. The cryptographic facility 4 provides a secure location for executing key management and cryptographic processing functions in response to the received service request. The cryptographic instruction storage 10 receives over input/output path 8 a cryptographic service request for performing a key management or cryptographic processing function with one or more cryptographic keys. The scheduler unit 32 has an in line 33 coupled to the input/output path 8, for receiving control vectors CV1, . . .,CVm associated with the cryptographic keys.

Figure 30:
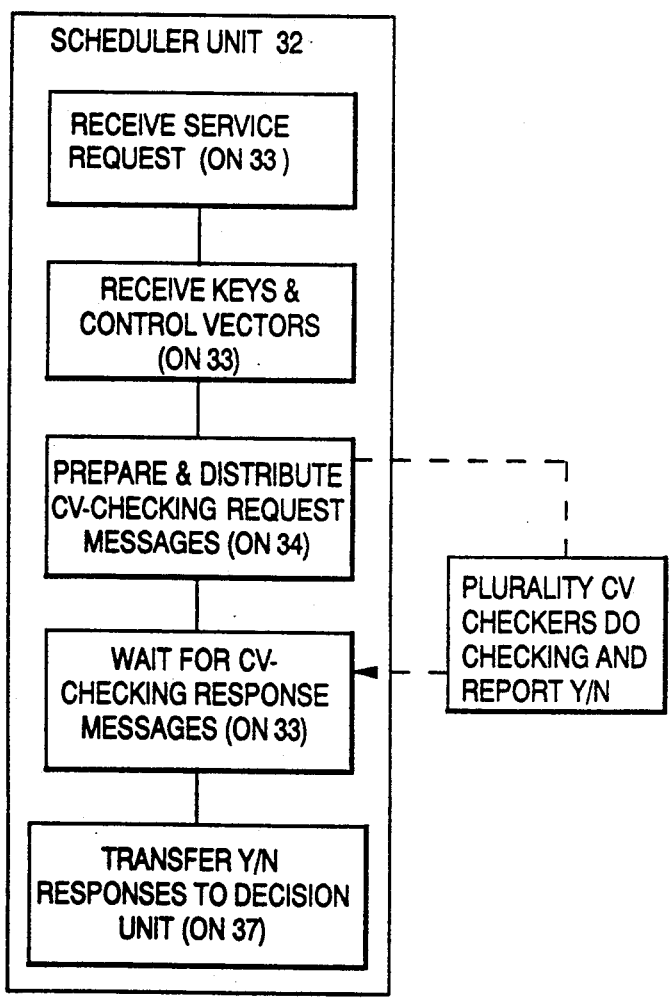
FIG. 30 is a flow diagram of a scheduler unit.

FIG. 30 is a flow diagram of the steps performed by scheduler unit 32. Referring now to FIG. 30, scheduler unit 32 prepares n CV field sets FS1, . . .,FSn from the received control vectors CV1, . . .,CVm, and optionally n control vector checking processes P(1), . . .,P(n), i.e., a CV field set and a control vector checking process for each of the n cryptographic devices/systems PU(1) through PU(n) where remote CV checking is to be performed. The control vector checking processes P(1), . . .,P(n) may be stored programs maintained in a library of CV checking program inside the cryptographic facility 4 of device/system PU(t). In an alternate embodiment, control vector checking processes can be pre-initialized in each remotely-originated CV checking units 31. That is, each remotely-originated CV checking unit 31 of each device/system in the network, including PU(1) through PU(n) and PU(t), contains a library of CV checking processes, or at least those CV checking processes which it requires to perform CV checking, such that any CV checking process can be performed by any checking unit 31 or such that any prearranged and agreed to subset of CV checking processes can be performed by an so-designed checking unit 31. Thus, the CV checking processes stored in checking unit 31 may be different and dependent on the device/system type, or the location of the device, or whatever criterion desired. Scheduler unit 32 may indeed be required to schedule CV checking according to the capabilities of those devices/systems, and each scheduler unit 32 may be required to maintain a list of CV checking capabilities for each such device/system.

Figure 33:
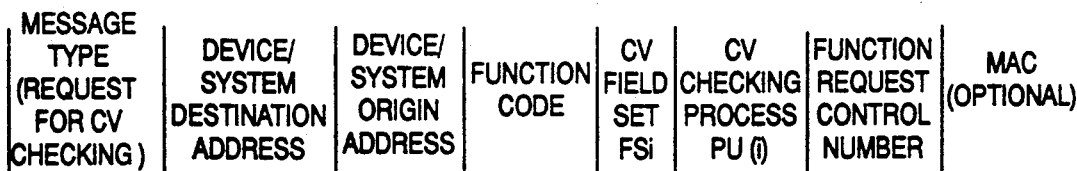
FIG. 33 illustrates the control vector checking request message format.

In response, scheduler unit 32 prepares n CV checking request messages, designated MREQ1, . . .,MREQn. FIG. 33 is a block diagram representation of a typical CV checking request message. Referring to FIG. 33, the CV checking request message contains the following fields of information: (1) message type, (2) device/system destination address, (3) device/system origin address, (4) function code, (5) CV field set FSi, (6) CV checking process P(i), (7) function request control number, and (8) MAC. The message type field identifies the message as a CV checking request message. The device/system destination address contains the address of the device/system where CV checking is to be performed. The device/system origin address contains the address of the managing device, where the CV checking request message originates. In lieu of address, device/system identifies, names, etc. can be used, as long as these identifies, names, etc., uniquely identify the devices/systems within the network. The function code is an encoded parameter specifying the cryptographic instruction and parameter options selected within the instruction that were originally received by the managing device/system PU(t) in the cryptographic service request. These instruction parameter options are required by some CV checking routines, although some implementations may not require this parameter (depending on how sophisticated the CV checking process is). The function request control number which uniquely identifies each CV checking request message issued by the scheduler unit 32. For example, scheduler unit 32 may choose to implement the function request control number by using an incrementing counter within the CF4. Each time a CV checking request message is prepared, the counter is incremented and the value is used as the function request control number. In lieu of this, a free running clock value, such as a time of day clock or free running counter, can be used for the function request control number. Provided that the function request control number has enough bits, say in the order of 64 bits, a random number generated via a random number generator located within the CF4 can be used to obtain values to be used as the function request control number. The chance of accidental repeated values is very small in this case. The MAC is an optional message authentication code calculated on the CV request message using a secret MAC key shared in advance between the origin and destination devices/systems. Such a MAC key is used to protect the integrity of messages transmitted between the two devices/systems. Protocols and procedures for calculating and using MACs to authenticate received messages is well-known and described in the prior art (see C. H. Meyer and S. M. Matyas, "Cryptography—A New Dimension in Computer Data Security," John Wiley and sons, Inc., 1982). If the CV checking processes are pre-initialized in checking units 31, then an encoded value "i" identifying the CV checking process may be sent in the CV checking request message in lieu of the CV checking process itself PU(i). In that case, value "i" identifies PU(i). Furthermore, the CV checking process field may be omitted from the CV checking request message altogether if the destination devices can determine which CV checking processes are to be performed from the context in which the requests are received. Those skilled in the art will recognize that various options exist wherein the device/systems perform CV checking according to a prearranged agreement, such that only a subset of the information in the CV checking request message shown in FIG. 33 may be necessary in order for the described protocol to operate.

Referring again to FIG. 33, scheduler unit 32 next transmits CV request messages MREQ1 through MREQn to devices/systems PU(1) through PU(n), respectively, via out lines 34 coupled to bus 12 thence via input/output path 8 and thence via communications link 50 (as shown in FIG. 29). Referring again to FIG. 33, scheduler unit 32 then waits for n CV checking response message MRESP1, . . .,MRESPn to be received from devices/systems PU(1), . . .,PU(n) on line 33 (of FIG. 29), respectively. Each CV checking response message contains the following fields of information: (1) message type, (2) device/system destination address, (3) device/system origin address, (4) function request control number, (5) response, and (6) MAC. The message type field identifies the message as a CV checking response message. The device/system destination address contains the same device/system origin address specified in the received CV checking request message. The device/system origin address contain the same device/system destination address specified in the received CV checking request message. The function request control number is just the same function request control number received in the CV checking request message. The response is an encoded value of "yes" if CV checking succeeds or "no" if the CV checking fails. The MAC is an optional message authentication code calculated on the CV response message using a secret MAC key shared in advance between the origin and destination devices/systems. The MAC key may be the same MAC key used to calculate a MAC on the CV checking request message, or it may be a different key. Upon receipt of the n CV checking response messages MRESP1 through MRESPn, scheduler unit 32 optionally validates the MACs, if present. Referring now to FIG. 29, schedule unit 32 next passes the response messages via line 37 to decision unit 35.

Figure 31:
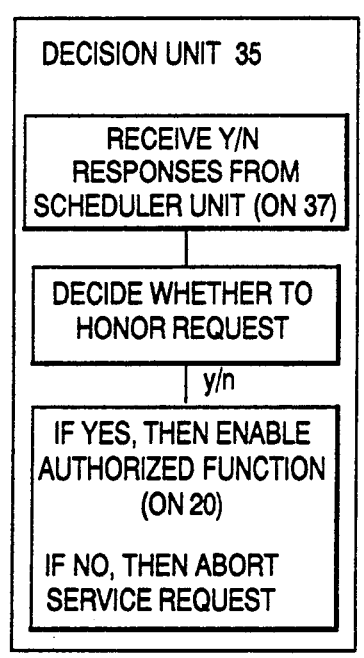
FIG. 31 is a flow diagram of the steps performed by the decision unit.

FIG. 31 is a flow diagram of the steps performed by decision unit 35. Referring now to FIG. 31, decision unit 35 decides on the basis of a stored decision algorithm whether to honor the requested cryptographic function or not. Many decision or vote counting strategies are possible, and a discussion of these various decision procedures is provided in the summary of the invention. One method requires a "yes" response in all n CV checking response messages, i.e., indicating that CV checking has succeeded at each of the devices/systems PU(1) through PU(n).

Referring again to FIG. 30, an option also exists for scheduler unit 32 to schedule part or all of the CV checking at device/system PU(t). In that case, CV checking is performed by local CV checking unit 14. Scheduler unit 32 therefore waits on CV checking response messages from those external devices/systems where remote CV checking has been requested and/or upon a response from local CV checking unit 14 if such local CV checking has been requested. If local CV checking is performed, a yes/no response is sent from local CV checking unit 14 to scheduler 32 in lieu of a CV checking response message.

Referring again to FIG. 29, decision unit 35 has an authorization output 20 which is connected to an input of the cryptographic processing unit 16, for signaling that key management and cryptographic processing functions are authorized; the receipt of the authorization signal by the cryptographic processing unit 16 initiates the performance of the requested cryptographic function with the cryptographic keys and data provided with the service request. A cryptographic key storage unit 22 is coupled to the cryptographic facility 4 over the input/output path 8. The cryptographic key storage unit 22 stores the cryptographic keys in an encrypted form in which each cryptographic key is encrypted under a storage key which is the logical product of the associated control vector and the master key stored in key storage 18. Such a logical product is represented as KM.C, where KM is the master key KM and C is the control vector. When more than one key and control vector are required for a service request, all control vectors are checked, and decision unit 35 must find the yes/no answers in the received CV checking response messages satisfactory in order for an authorize signal to be provided to the cryptographic processing unit 16. In response thereto, cryptographic processing unit 16 executes the appropriate cryptographic instruction or instructions in cryptographic instruction storage 10. The output or outputs are then passed or transferred to the program (CFAP 54 and thence, if appropriate, to APPL 55) via input/output path 8.

Scheduler unit 32 optionally has a service request queuing capability, such that multiple service requests can be scheduled and the scheduler unit 32 can have a queue of outstanding service requests and CV checking response messages upon which it is waiting. As responses are received, the queue is updated. When all responses for a queued service request have been received, the service request is removed from the queue and the list of received CV checking response messages for that service request (after the MACs, if present, on them have been successfully validated) are passed to decision unit 35 as already discussed. Scheduler unit 32 optionally may schedule local CV checking unit 14 in response to a first service request, which is handled totally by local CV checking unit 14, and it may schedule remote CV checking via devices/systems PU(1) through PU(n) based on a second service request received by scheduler unit 32 before the first service request has completed.

Figure 32:
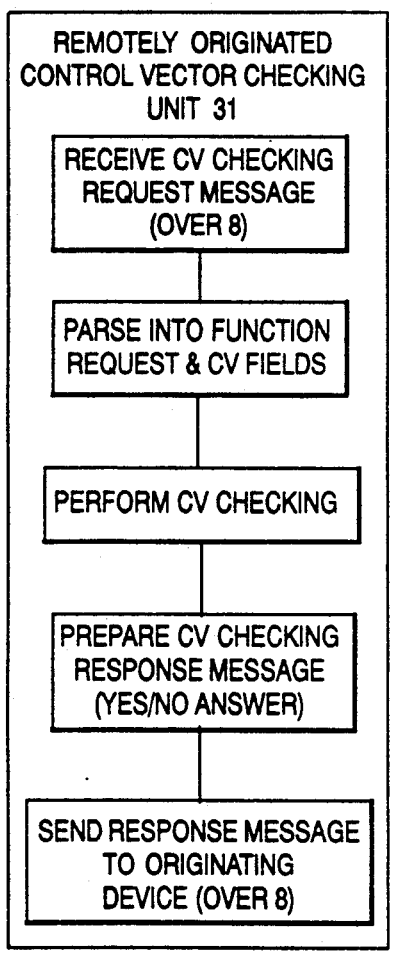
FIG. 32 is a flow diagram of the steps performed by the remotely originated control vector checking unit.
Figure 34:
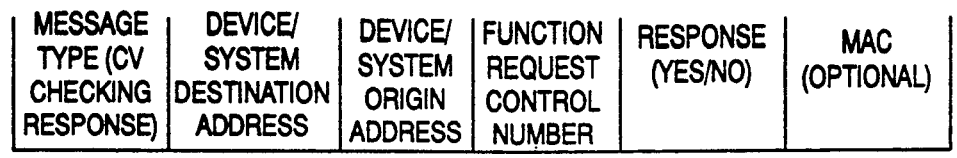
FIG. 34 illustrates the control vector checking response message format.

FIG. 32 is a flow diagram of the steps performed by remotely-originated CV checking unit 31. Referring to FIG. 32, at a remote device/system, say PU(1), remotely-originated CV checking unit 31 receives a CV checking request message MREQ1 over input/output path 8. If a MAC is present, then CV checking unit 31 first validates the MAC using the prearranged secret MAC key shared between the originating device/system (i.e., PU(t)) and the destination device/system (i.e., PU(1)). The received CV field set FS1 is then checked using CV checking process P(1), also received in the CV checking request message MREQ1. If P(1) has been pre-initialized at PU(1) and value "1" is sent in MREQ1 in lieu of P(1), then value "1" is used to access P(1). Alternately, value "1" is not sent in MREQ1 and P(1) is known by PU(1) from the context of the protocol. Those skilled in the art will recognize that these and many protocols exist for communicating the information to PU(1) that relates a received CV field set FS1 to the CV checking process P(1) stored at PU(1). Next, a CV checking response message MRESP1 is prepared in accordance with the format designated in FIG. 34 consisting of the following fields: (1) message type (i.e., CV checking response message), (2) device/system destination address (i.e., PU(t) in the example), (3) device/system origin address (i.e., PU(1) in the example), (4) function request control number (i.e., the same function request control number received in MREQ1, echoed back to PU(t)), (5) response (i.e., a "yes" or "no"), and an optional MAC (i.e., a message authentication code calculated on the previous fields using prearranged MAC key). MRESP1 is then sent PU(t) via communications link 28 and thence to scheduler unit 31 via input/output path 8 located inside the cryptographic facility 4 of the device/system PU(t).

Figure 35:
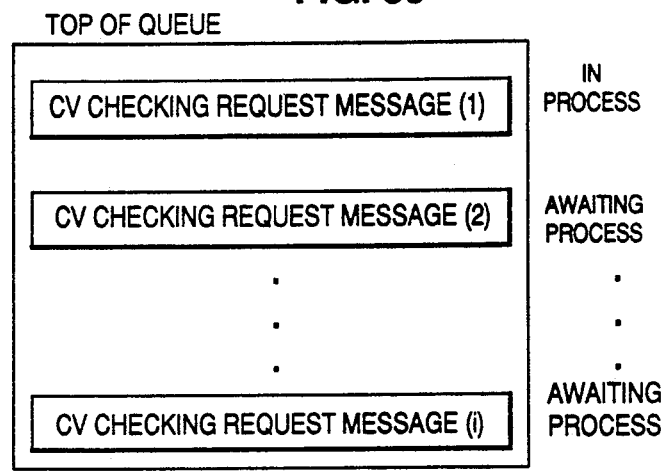
FIG. 35 illustrates a queue of remotely originated control vector checking request messages.

Checking unit 31 also has a queue for storing received CV checking request messages, as shown in FIG. 35. This enables CV checking unit 31 to receive and process CV checking request messages at the same time (i.e., in parallel) rather than requiring checking unit 31 to operate in serial fashion.

The advantage in performing CV checking via multiple distributed processors (i.e., using multiple cryptographic facilities in lieu of a single cryptographic facility) include those already mentioned for CV checking via multiple processors in a parallel processing environment. However, CV checking via multiple distributed processes provides a further improvement. Consider a network embodiment consisting of a plurality of workstations or terminals with a cryptographic capability and a plurality of workstation/terminal users who possess a smart card with a cryptographic capability. When performing work at the workstation/terminal, the user must first provide his/her smart card by inserting the smart card into a smart card reader attached to the workstation/terminal. The user, workstation/terminal, and smart card enter into a cryptographic handshake protocol which verifies each of the components to the other, or some acceptable subset of the components are authenticated to each other. Cryptographic handshake protocols are well-known in the prior art, and are not considered germane to the present invention (see C. H. Meyer and S. M. Matyas, "Cryptography—A New Dimension in Computer Data Security," John Wiley and Sons, Inc., 1982). As a result of the logon sequence, the smart card and workstation/terminal have established a communication channel, which may involve encryption for data privacy or authentication purposes. Again, cryptographic methods for encryption and authentication of data are well-known in the prior art, and are not considered germane to the present invention (see C. H. Meyer and S. M. Matyas, "Cryptography—A New Dimension in Computer Data Security," John Wiley and Sons, Inc., 1982). In such an environment, users interact at the workstation/terminal using application programs which issue cryptographic service requests to the cryptographic facility. However, in order to reduce vendor product cost, part or all of the CV checking is performed via a cryptography facility on the smart card. In this regard, the CV checking is not just a "rearrangement of the parts" so-to-speak, for no purpose, but the vendor products (both the workstation/terminal and smart card) are designed in conjunction with one another so that the overall product cost (the sum of the two) is less than would otherwise be possible by performing the CV checking in the workstation/terminal. However, there are still further advantages in such a division of the CV checking. The smart card represents a technology and product that can easily and conveniently be programmed, or tailored, to a particular set of users. For example, a vendor can preload a first set of smart cards with microcode particular to a first customer set, say a consortium of wholesale banks; it can preload a second set of smart cards with microcode particular to a second customer set, say a particular customer such as a Lloyds Bank; it can preload a third set of smart cards with microcode particular to a third customer set, say the Federal Reserve Board (FRB). Now the CV checking performed by the first customer set may be tailored to that customer based on cryptographic applications particular to that first customer, whereas the CV checking performed by the second customer set may be tailored to that customer based on cryptographic applications different and particular to that second customer, etc. If the vendor finds that most customers have some CV checking in common, based on common cryptographic applications fundamental to all customers, then this element of CV checking can, at the vendor's option, be located in the cryptographic facility of the workstation/terminal. In this regard, CV checking via distributed processors offers not only a tradeoff in cost based on technology and products involved, but it offers a convenient and cost effective method to balance CV checking on the basis of common functions and functions particular to a set of customers, and to tailor CV checking to those customer sets thereby lowering the overall workstation/terminal product cost while still providing full functionality to each of the customer sets.

Figure 36:
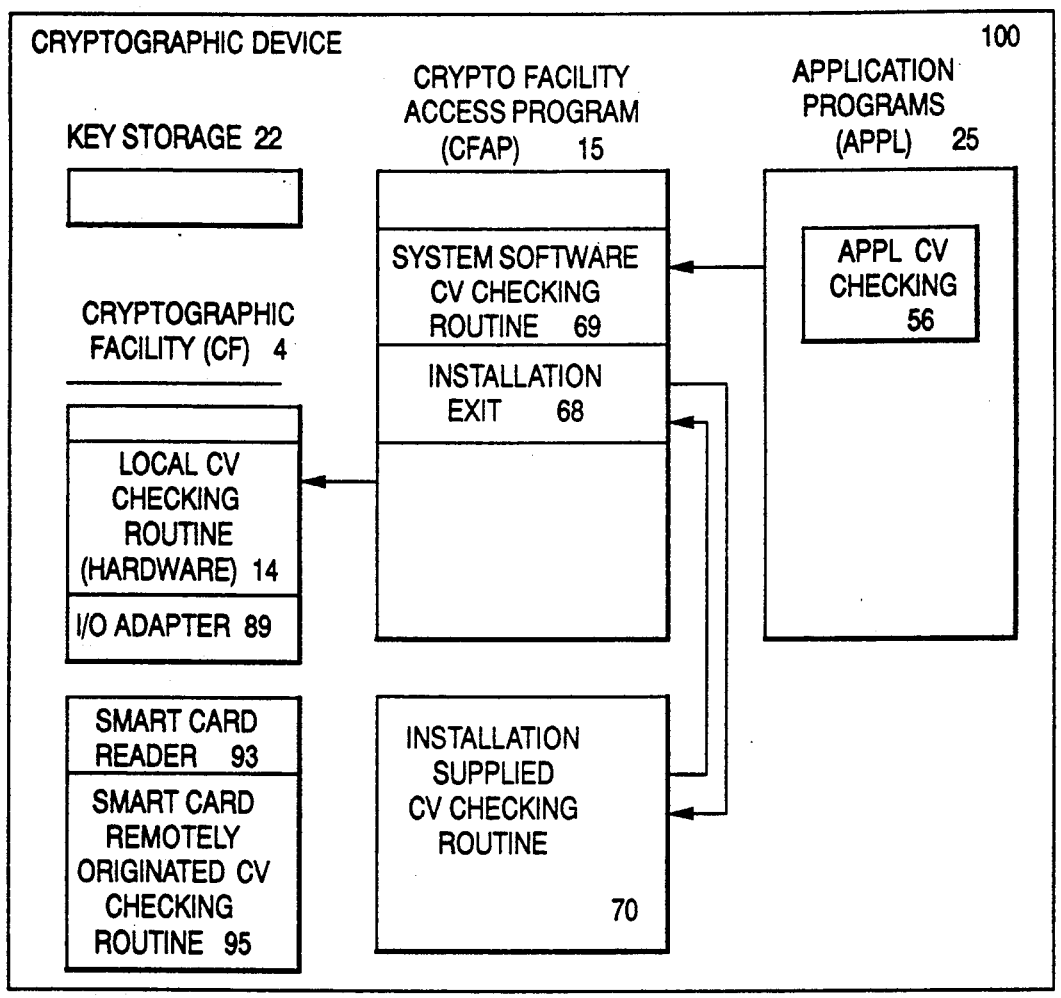
FIG. 36 is a block diagram of a control vector checking in a multiprogramming and multiprocessor environment.
Figure 37:
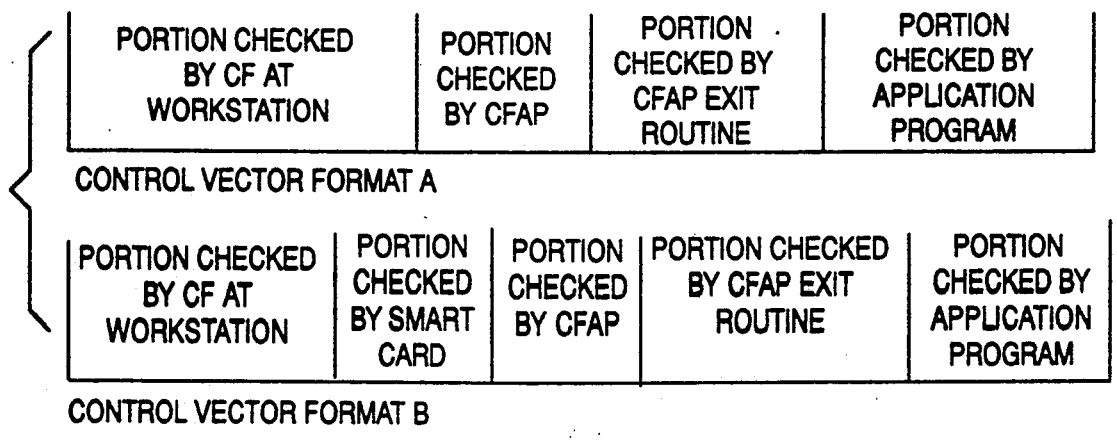
FIG. 37 illustrates a compartmentalized control vector format.

Thus far, CV checking has been described in terms of parallel computations, either via a multiple parallel processor (e.g., in a single large machine) or via distributed processors (viz., using cryptographic facilities connected via a communications link, or some other path). But advantageous implementations can be obtained by serializing the CV checking process, as previously described in FIG. 23. FIG. 36 is a block diagram representation of control vector checking in a multiprogramming and a multiprocessing environment, where CV checking is performed in a serial fashion rather than in a parallel fashion. Control vector formats A and B in FIG. 37 represent compartmentalized formats such that each part is checked in serial fashion by a different part of the system. Referring to FIG. 37, format A illustrates a control vector wherein a first part is checked by the application program, a second part is checked by an installation-supplied routine which receives control via a CFAP exit, a third part checked by CFAP, and a fourth part checked by the cryptographic facility (i.e., the cryptographic facility of the device/system). Each of these parts are checked via software or hardware, each representing a different level of security and integrity within the device/system. Since application programs typically execute in nonprivileged mode, this represents the lowest level of achieved security/integrity. Since CFAP and CFAP exit routines typically execute in a higher system state, e.g., privileged state, a corresponding higher level of CV checking security/integrity is achieved. Since the cryptographic facility (CF) is typically implemented in hardware, with secure/protected interfaces, CV checking at this level has the highest security/integrity.

The property of field independence associated with the control vector is a key factor in permitting the embodiment of FIG. 36. As far as the cryptographic system vendor is concerned, the portions of the control vector checked by the CF and CFAP are the only portions of the control vector that the vendor must define. The control vector portions checked by a CFAP exit routine or by the application program can be implemented as "don't care bits," i.e., the CF and CFAP do no checking of these fields (thus permitting any bit settings to be valid for these fields as far as CF and CFAP are concerned). The bits in the control vector defined as "don't care bits" can be used by the customer in any way most advantageous to the customer; except that the customer must not architect any control vector usage and checking that violates or contradicts the CV checking performed by CFAP and the CF. Otherwise the customer has complete freedom.

The CV checking is both serial and hierarchical. The CF has the "final word" so-to-speak, checking the control vector last. The CFAP has the "next to final word," checking the control vector after the customer has completed CV checking and before the CF performs its CV checking. CV checking performed via a CFAP exit routine has precedence over CV checking performed by the application program, since such exit routines will normally execute at a higher privileged machine state. Thus, the customer can provide CV checking controls on its users, i.e., it can "police" to some extent the cryptographic operations requested by the application programs. The application programs themselves have the lowest level of protection, since they typically operate in a nonprivileged machine state. Other access control mechanisms such as the IBM Resource Access Control Facility (RACF) can be used to layer the CV checking into a hierarchical structure with levels of security/integrity, as well, or in lieu of, the privileged/nonprivileged machine states normally associated with CFAP exit routines and application programs, respectively. Although the application program operate at the lowest level of security/integrity in the system, it nevertheless can perform useful CV checking. While it may be true that applications executing on the same device/system have limited or no protection from one another, in a distributed system network the applications executing on one machine may have excellent isolation from those executing on another machine. Thus, CV checking enforced at the application layer in one machine can effectively control key usage by other applications in another machine. In effect, machine to machine control can be effected even at the application layer.

Referring now to FIG. 36, a crypto service request initiated with an application program (APPL at 25) is preceded by CV checking 56, using control vectors of the keys associated with the service request. If keys and control vectors are stored in key storage 22, CFAP may provide a function allowing the application to first request access to the necessary control vectors in order that CV checking 56 can be usefully performed.

Upon completion of CV checking 56, a crypto service request is issued by APPL 25 to CFAP 15. The presumption here is that a service request is made only if CV checking 56 succeeds; otherwise the service request by the application is aborted (i.e., is not made). In response, CFAP may access one or more encrypted keys and control vectors from key storage 22, and keys and control vectors may be passed from APPL 25 to CFAP 15 in the service request, as well.

Control is next passed to an installation-supplied CV checking routine via a CFAP-provided installation exit 68, passing all necessary control vectors together with an indication of the service request. In essence, all information necessary for CV checking to be performed by the routine is passed to it by CFAP. Otherwise, it is assumed that the routine stores the necessary CV checking processes that it needs. If CV checking succeeds a "yes" response is passed to CFAP; otherwise a "no" response is passed to CFAP. CFAP continues with the service request only if a "yes" response is received from the exit routine; otherwise it aborts the service request.

Next, the appropriate CFAP level portions of all control vectors are checked by CFAP using system software CV checking routine 69. If CV checking succeeds, CFAP issues a service request to CF4; otherwise the service request made by APPL 25 is aborted. In like manner, the CF checks its appropriate portions of the control vectors via local hardware CV checking unit 14. If CV checking succeeds, the requested cryptographic function is executed, in the manner and way described elsewhere in this invention; otherwise the cryptographic function is not executed. The outputs of the function are returned to CFAP 15, and in turn the outputs may be stored by CFAP in key storage 22, or returned to the APPL 25, or some combination of both may be performed by CFAP.

Referring again to FIG. 37, control vector format B is the same as format A except that it contains a portion of the CV which is to be checked via a smart card. The portion of the CV to be checked by the smart card is assigned to the smart card in lieu of performing the checking in CF hardware of the workstation or terminal. Those skilled in the art will recognize that such CV checking can easily be combined with the CV checking already described for control vector format A, i.e., by extending the embodiment already described to include an extension for checking part of the CV in the smart card.

The advantage of the serialized method of CV checking is not that the procedure is serialized, but that the serialization process affords a means to apportion CV checking to different parties within a single device/system that have different CV checking requirements and to maintain a hierarchy of security and integrity in the CV checking process. The vendor can concentrate on CV checking procedures common to all customer sets, thus placing this element of CV checking in the CF hardware or CFAP software. The element of CV checking varies from customer set to customer set can be left to the customer. The vendor only needs to implement those portions of the control vector as "don't care bits." The customer is presented with the happy situation where he can tailor his cryptographic applications to achieve whatever level of key usage control that is desired.

Although a specific embodiment of the invention has been disclosed, it will be fully understood by those having skill in the art that minor changes can be made to that specific embodiment without departing from the spirit and the scope of the invention.

What is claimed is:

1. In a data processing system which executes cryptographic functions with cryptographic keys which are associated with control vectors defining the functions which each key is allowed by its originator to perform, a method for validating that a cryptographic function to be performed with a cryptographic key has been authorized by the originator of the key, comprising:
   receiving a representation of said cryptographic key which is encrypted under an exclusive OR product of a reference key and an associated control vector;
   receiving a candidate control vector;
   checking a first field of said candidate control vector to determine if said cryptographic function is authorized to be performed by said cryptographic key;
   checking a second field of said candidate control vector to determine if said cryptographic function is authorized to be performed by said cryptographic key;
   decrypting said representation of said cryptographic key under an exclusive OR product of said candidate control vector and said reference key and recovering said cryptographic key only if said candidate control vector is equivalent to said associated control vector.

2. In a data processing system which executes cryptographic functions with cryptographic keys which are associated with control vectors defining the functions which each key is allowed by its originator to perform, a method for validating that a cryptographic function to be performed with a cryptographic key has been authorized by the originator of the key, comprising:
   receiving a representation of said cryptographic key which is encrypted under an exclusive OR product of a reference key and an associated control vector;
   receiving a candidate control vector;
   checking a first field of said candidate control vector to determine if said cryptographic function is authorized to be performed by said cryptographic key;
   checking a second field of said candidate control vector to determine if said cryptographic function is authorized to be performed by said cryptographic key;
   decrypting said representation of said cryptographic key under an exclusive OR product of said candidate control vector and said reference key and recovering said cryptographic key only if said candidate control vector is equivalent to said associated control vector;
   executing said cryptographic function with said cryptographic key only if the first and second said checking steps determine that the function is authorized to be performed.

3. In a data processing system which executes cryptographic functions with cryptographic keys which are associated with control vectors defining the functions which each key is allowed by its originator to perform, a method for validating that a cryptographic function to be performed with a cryptographic key has been authorized by the originator of the key, comprising:
   receiving in a first processor in said system, a representation of said cryptographic key which is encrypted under an exclusive OR product of a reference key and an associated control vector;
   receiving in said first processor at least a first field of a candidate control vector;
   receiving in a second processor in said system, at least a second field of said candidate control vector;
   checking said second field of said candidate control vector in said second processor to determine if said cryptographic function is authorized to be performed by said cryptographic key and outputting the results of said checking to said first processor;
   checking said first field of said candidate control vector in said first processor to determine if said cryptographic function is authorized to be performed by said cryptographic key;
   decrypting said representation of said cryptographic key under an exclusive OR product of said candidate control vector and said reference key and recovering said cryptographic key only if said candidate control vector is equivalent to said associated control vector;
   executing said cryptographic function with said cryptographic key in said first processor only if the first and second said checking steps determine that the function is authorized to be performed.

4. The method of claim 3, wherein said first processor is a host processor and said second processor is a smart card processor coupled to said host processor.

5. The method of claim 3, wherein said first processor is a terminal processor and said second processor is a smart card processor coupled to said terminal processor.

6. The method of claim 3, wherein said first processor is a smart card processor and said second processor is a terminal processor coupled to said smart card processor.

7. The method of claim 3, wherein said first and said second processor are coupled over a communications link in a distributed processing system.

8. In a data processing system which executes cryptographic functions with cryptographic keys which are associated with control vectors defining the functions which each key is allowed by its originator to perform, a method for validating that a cryptographic function to be performed with a cryptographic key has been authorized by the originator of the key, comprising:
   executing a first program and a second program with a processor in the system operating in a multiprogramming mode;
   receiving a representation of said cryptographic key which is encrypted under an exclusive OR product of a reference key and an associated control vector;
   receiving at least a first field of a candidate control vector;
   receiving at least a second field of said candidate control vector;
   checking said second field of said candidate control vector in said second program to determine if said cryptographic function is authorized to be performed by said cryptographic key and outputting the results of said checking;

checking said first field of said candidate control vector in said first program to determine if said cryptographic function is authorized to be performed by said cryptographic key;

decrypting said representation of said cryptographic key under an exclusive OR product of said candidate control vector and said reference key and recovering said cryptographic key only if said candidate control vector is equivalent to said associated control vector;

executing said cryptographic function with said cryptographic key only if the first and second said checking steps determine that the function is authorized to be performed.

9. In a data processing system which executes cryptographic functions with cryptographic keys which are associated with control vectors defining the functions which each key is allowed by its originator to perform, a method for validating that a cryptographic function to be performed with a cryptographic key has been authorized by the originator of the key, comprising:

receiving in a managing processor in said system, a representation of said cryptographic key which is encrypted under an exclusive OR product of a reference key and an associated control vector;

receiving in a first processor in said system, at least a first field of a candidate control vector;

receiving in a second processor in said system, at least a second field of said candidate control vector;

checking said first field of said candidate control vector in said first processor to determine if said cryptographic function is authorized to be performed by said cryptographic key and outputting the results of said checking to said managing processor;

checking said second field of said candidate control vector in said second processor to determine if said cryptographic function is authorized to be performed by said cryptographic key and outputting the results thereof to said managing processor;

decrypting said representation of said cryptographic key with said candidate control vector and said reference key and recovering said cryptographic key only if said candidate control vector is equivalent to said associated control vector;

executing said cryptographic function with said cryptographic key in said managing processor only if the first and second said checking steps determine that the function is authorized to be performed.

10. The method of claim 9, wherein said managing processor is a host processor, said first processor is a terminal processor coupled to said host processor and said second processor is a smart card processor coupled to said terminal processor.

11. The method of claim 9, wherein said managing processor is a smart card processor, said first processor is a terminal processor coupled to said smart card processor and said second processor is host processor coupled to said terminal processor.

12. The method of claim 9, wherein said first processor is a smart card processor and said managing processor and said second processor are a terminal processor coupled to said smart card processor.

13. The method of claim 9, wherein managing processor, said first and said second processor are coupled over a communications link in a distributed processing system.

14. The method of claim 9, wherein said managing processor sends request messages to said first and said second processors to perform control vector checking operations and said first and second processors send response messages to said managing processor as to the results of said checking.

15. The method of claim 14, wherein said managing processor requires an authorization response from both said first and second processors before executing said cryptographic function.

16. The method of claim 14, wherein said managing processor performs a voting assessment of the responses from said first and second processors before executing said cryptographic function.

17. In a data processing system which executes cryptographic functions with cryptographic keys which are associated with control vectors defining the functions which each key is allowed by its originator to perform, a method for validating that a cryptographic function to be performed with a cryptographic key has been authorized by the originator of the key, comprising:

executing a managing program, a first program and a second program with a processor in the system operating in a multiprogramming mode; p1 receiving a representation of said cryptographic key which is encrypted under an exclusive OR product of a reference key and an associated control vector;

receiving at least a first field of a candidate control vector;

receiving at least a second field of said candidate control vector;

checking said first field of said candidate control vector with said first program to determine if said cryptographic function is authorized to be performed by said cryptographic key and outputting the results of said checking;

checking said second field of said candidate control vector with said second program to determine if said cryptographic function is authorized to be performed by said cryptographic key and outputting the results thereof;

decrypting said representation of said cryptographic key under an exclusive OR product of said candidate control vector and said reference key and recovering said cryptographic key only if said candidate control vector is equivalent to said associated control vector;

executing said managing program to perform said cryptographic function with said cryptographic key only if the first and second said checking steps determine that the function is authorized to be performed.

18. In a data processing system which processes cryptographic service requests for the performance of cryptographic functions with cryptographic keys which are associated with control vectors defining the functions which each key is allowed by its originator to perform, an apparatus for validating that a cryptographic function requested to be performed with a cryptographic key has been authorized by the originator of the key, comprising:

a cryptographic facility having an I/O path for receiving a first expression which is a cryptographic key encrypted under an exclusive OR product of a reference key and an associated control vector, and also receiving a second expression which is a candidate control vector, there being included in said cryptographic facility a cryptographic processing means coupled to said I/O path for executing a cryptographic function with said cryptographic key;

a first control vector checking means having an input to receive at least a first portion of said second expression and to receive a cryptographic service request to perform said cryptographic function with said cryptographic key, for performing a first check of said first portion of said second expression to determine if said cryptographic function is authorized to be performed by said cryptographic key;

said first control vector checking means having a first authorization output coupled to said cryptographic processing means, for outputting a first authorization signal that said cryptographic function is authorized to be performed by said cryptographic key;

a second control vector checking mean having an input to receive at least a second portion of said second expression and to receive a cryptographic service request to perform said cryptographic function with said cryptographic key, for performing a second check of said second portion of said second expression to determine if said cryptographic function is authorized to be performed by said cryptographic key;

said second control vector checking means having a second authorization output coupled to said cryptographic processing means, for outputting a second authorization signal that said cryptographic function is authorized to be performed by said cryptographic key;

said cryptographic facility recovering said cryptographic key from said first expression only if said second expression is equivalent to said associated control vector;

said cryptographic processing means initiating the execution of said cryptographic function with said cryptographic key in response to receiving said first and second authorization signals.

19. The apparatus of claim 18, wherein said cryptographic processing means is located in a first data processor in said system, said first control vector checking means is located in a second data processor in said system and said second control vector checking means is located in a third data processor in said system.

20. The apparatus of claim 18, wherein said cryptographic processing means is located in a data processor in said system, said first control vector checking means is located in a terminal connected to said data processor and said second control vector checking means is located in a smart card coupled to said terminal.

21. The apparatus of claim 18, wherein said first control vector checking means is located in a data processor in said system, said cryptographic processing means is located in a terminal connected to said data processor and said second control vector checking means is located in a smart card coupled to said terminal.

22. The apparatus of claim 18, wherein said cryptographic processing means, said first control vector checking means and said second control vector checking means are located in the same data processor in said system.

23. The apparatus of claim 22, wherein said first check performed by said first control vector checking means is controlled by a first component program in a multiprogramming operating mode and said second check performed by said second control vector checking means is controlled by a second component program in said multiprogramming operating mode, said first authorization signal being directed from said first control vector checking means to said second control vector checking means.

24. The apparatus of claim 18, wherein said cryptographic processing means, said first control vector checking means and said second control vector checking means are located in the same cryptographic facility in a data processor in said system.

25. In a data processing system which processes cryptographic service requests for the performance of cryptographic functions with cryptographic keys which are associated with control vectors defining the functions which each key is allowed by its originator to perform, a process for validating that a cryptographic function requested to be performed with a cryptographic key has been authorized by the originator of the key, comprising the steps of:

receiving a cryptographic key and an associated control vector at cryptographic processing means in a cryptographic facility characterized by a secure boundary which provides a secure location to execute a cryptographic function with said cryptographic key;

receiving at least a first portion of said associated control vector and a cryptographic service request to perform said cryptographic function with said cryptographic key in a first control vector checking means;

performing a first check of said first portion of said associated control vector to determine if said cryptographic function is authorized to be performed by said cryptographic key;

outputting a first authorization signal from said first control vector checking means to said cryptographic processing means that said cryptographic function is authorized to be performed by said cryptographic key;

receiving at least a second portion of said associated control vector in a second control vector checking means;

performing a second check of said second portion of said associated control vector to determine if said cryptographic function is authorized to be performed by said cryptographic key;

outputting a second authorization signal from said second control vector checking means to said cryptographic processing means that said cryptographic function is authorized to be performed by said cryptographic key;

initiating the execution of said cryptographic function with said cryptographic key in response to said cryptographic processing means receiving said first and second authorization signals.

26. The method of claim 25, wherein said first check performed by said first control vector checking means is controlled by a first component program in a multiprogramming operating mode and said second check performed by said second control vector checking means is controlled by a second component program in said multiprogramming operating mode.

* * * * *